(12) United States Patent
Eldessouky et al.

(10) Patent No.: US 9,120,160 B1
(45) Date of Patent: Sep. 1, 2015

(54) POSITIVE FEED DRILL

(76) Inventors: Ahmed Eldessouky, Anaheim Hills, CA (US); Dalia Eldessouky, Anaheim Hills, CA (US)

(*) Notice: Subject to any disclaimer, the term of this patent is extended or adjusted under 35 U.S.C. 154(b) by 719 days.

(21) Appl. No.: 13/276,661

(22) Filed: Oct. 19, 2011

Related U.S. Application Data

(60) Provisional application No. 61/405,032, filed on Oct. 20, 2010.

(51) Int. Cl.
| | |
|---|---|
| B23B 45/04 | (2006.01) |
| B25B 23/00 | (2006.01) |
| B23Q 5/04 | (2006.01) |
| B25F 5/02 | (2006.01) |

(52) U.S. Cl.
CPC ............... *B23B 45/04* (2013.01); *B23Q 5/045* (2013.01); *B25B 23/0028* (2013.01); *B25F 5/02* (2013.01)

(58) Field of Classification Search
CPC .. B25B 21/00; B25B 21/002; B25B 23/0028; B23Q 5/045; B23B 39/006; B23B 45/00; B23B 45/04; B25F 3/00; B25F 5/001; B25F 5/02; F16H 1/14
USPC ........... 173/29, 213, 216, 168, 171, 148, 152, 173/218; 408/35, 42, 124, 125; 81/57.26, 81/57.31, 57.32
See application file for complete search history.

(56) References Cited

U.S. PATENT DOCUMENTS

| | | | | |
|---|---|---|---|---|
| 5,149,230 | A | * | 9/1992 | Nett ................................ 408/42 |
| 5,533,581 | A | * | 7/1996 | Barth et al. ................... 173/216 |
| 5,690,183 | A | * | 11/1997 | Sollami ......................... 173/216 |
| 6,039,126 | A | * | 3/2000 | Hsieh ............................ 173/216 |
| 6,352,127 | B1 | * | 3/2002 | Yorde ........................... 173/216 |
| 6,506,002 | B1 | * | 1/2003 | Cummins ....................... 408/35 |
| 6,691,800 | B1 | * | 2/2004 | Chi ................................ 173/216 |
| 6,796,385 | B1 | * | 9/2004 | Cobzaru et al. .................. 173/1 |
| 7,066,692 | B2 | * | 6/2006 | Kuhn ............................ 408/124 |
| 7,779,931 | B2 | * | 8/2010 | Townsan ....................... 173/216 |
| 7,836,968 | B2 | * | 11/2010 | Steverding et al. ............... 173/1 |
| 7,926,585 | B2 | * | 4/2011 | Pozgay et al. .................. 173/39 |

* cited by examiner

*Primary Examiner* — Scott A. Smith
(74) *Attorney, Agent, or Firm* — Fish & Tsang LLP

(57) ABSTRACT

Various embodiments of a drill are described in which the drill includes an air motor assembly having an output spindle and a head attachment having a cutter spindle. The head attachment can be removably connected to the motor assembly, and capable of being configured in at least (i) a first mode in which the cutter spindle is parallel to the output spindle of the air motor assembly, and (ii) a second mode in which the cutter spindle is orthogonal to the output spindle of the air motor assembly.

15 Claims, 39 Drawing Sheets

(e)

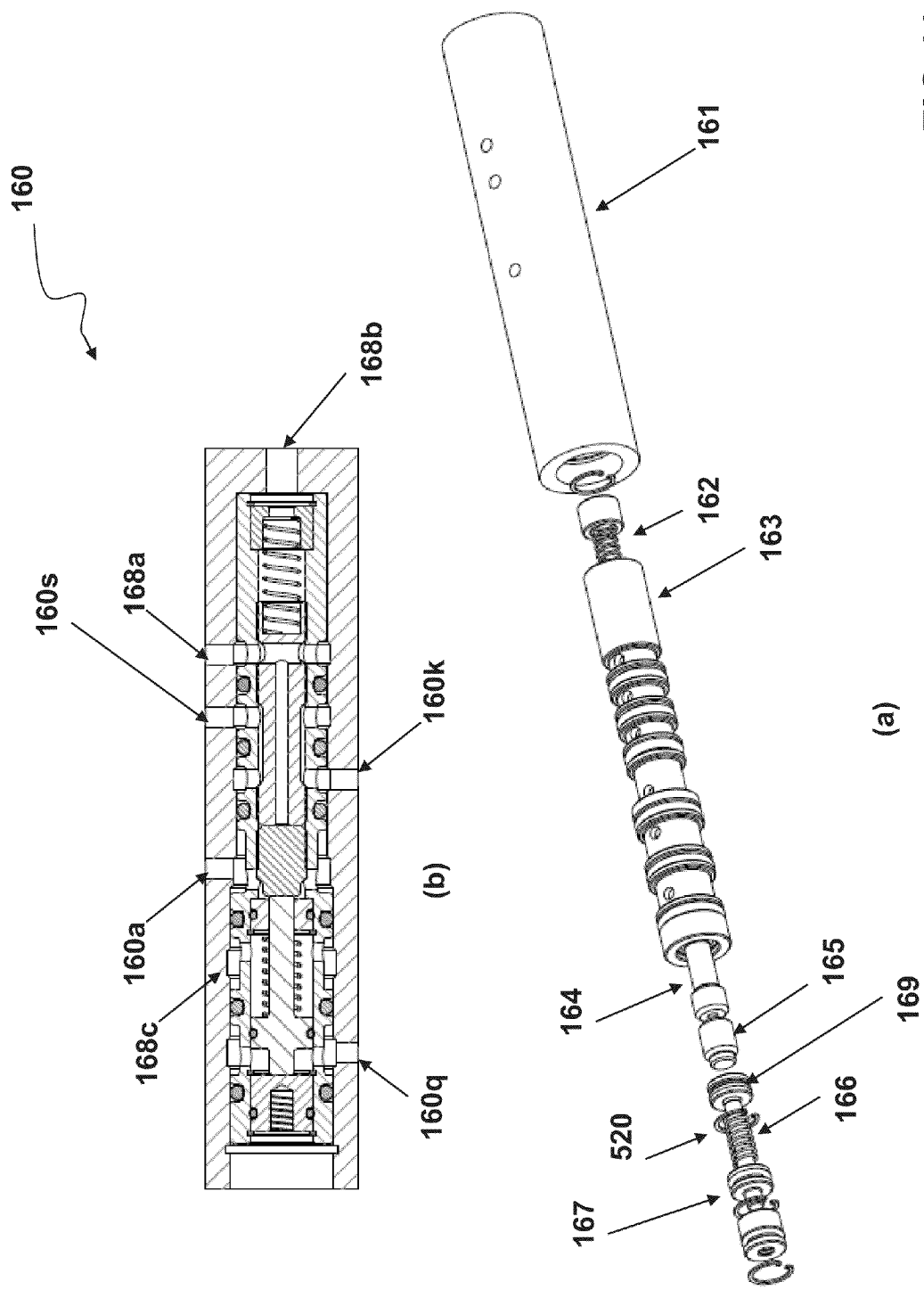

(c)

POSITIVE FEED DRILL

This application claims the benefit of priority to U.S. provisional application having Ser. No. 61/405,032 filed on Oct. 20, 2010. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is drills.

BACKGROUND

The principal of the positive feed drill has been in use in the aerospace industry for many years but the conventional drill is primitive and inefficient. There is a need for a light-weight drill with high output horsepower, efficient and fully automated positive controls that can operate in more than one mode. While there has been some attempts to automate the positive feed drill in the aerospace industry, previous attempts have been based on unreliable pneumatic logic controls, which resulted in drills that do not have enough horsepower, that are not easy to use or maintain, and which break down too easily-problems that can result in the halt of the production line and thus cost a lot of money and time for the customer.

SUMMARY OF THE INVENTION

The inventive subject matter provides apparatus, systems and methods in which one can utilize a fully automatic drilling machine used to drill, ream, or bore holes in the fuselage of aircraft or any similar structure.

The present invention is embodied in a drill that is capable of operation in two modes. The drill comprises an air motor assembly having an output spindle and a head attachment having a cutter spindle and a swivel or fixed nosepiece attachment. A cutter, a drill or a reamer (not shown) can be attached to the cutter spindle. Referring to FIG. 28; a nosepiece has a first and to be attached to either a swivel or non-swivel nosepiece attachment of the drill; the second end of the nosepiece can be threaded to a tooling plate, which positions the drill where the drilling or reaming operation takes place. In an embodiment of the invention, the swivel nosepiece attachment has eight positions that can orient the drill from one position to another radially around the centerline axis of the cutter spindle.

The removable head attachment connects to the air motor assembly, such that the head attachment is capable of being configured in an "in-line" mode or a "right-angle" mode. In the "in-line" mode, the cutter spindle is oriented parallel to the output spindle of the air motor assembly. In the "right-angle" mode, the cutter spindle is oriented orthogonal to the output spindle of the air motor assembly.

The head attachment further comprises a drive shaft assembly, a transfer gear assembly, a spindle assembly, nosepiece attachment, spindle cover plate with a center hole, pneumatic cover plate with four holes, spindle and pneumatic cover plates without holes. The drive assembly is driven by the air motor assembly. In turn, the drive assembly drives the transfer gear assembly. The transfer gear assembly drives the drill spindle assembly.

The drive shaft assembly includes a drive shaft, a bevel-spur gear assembly, and a drive bevel gear. For the operation in the "in-line" mode the spindle cover plate with a center hole will be used to allow the output spindle of the air motor to engage the drive shaft assembly. The pneumatic cover plate with four holes will also be used to communicate with the four holes on the front face of the air motor housing assembly. The spindle and the pneumatic cover plates without holes will be used on the other face of the head attachment to seal the unused ports and to prevent foreign material from entering the head attachment. The spindle cover plate with and without a center hole are interchangeable; they can be placed on either face of the head attachment. The pneumatic cover plate with and without holes are also interchangeable and can be placed on either face of the head attachment.

The drive shaft of the drive shaft assembly has a first end for receiving the output spindle of the air motor for operation in the "in-line" mode. The drive shaft of the drive shaft assembly has a second end for engaging the bevel-spur gear assembly. The bevel-spur gear assembly of the drive shaft assembly drives the transfer gear assembly, which in turn drive the drive gear as described below.

For operation in the "right-angle" mode, the drive shaft assembly further comprises the drive bevel gear. The drive bevel gear is mounted with its axis of rotation perpendicular to the axis of rotation of drive shaft, such that drive bevel gear engages bevel-spur gear assembly.

The transfer gear assembly comprises of an air piston, a support shaft, a clutch plate, a clutch feed gear, a spring and a transfer gear. The transfer gear assembly is oriented such that its support shaft is parallel to the drive shaft of the drive shaft assembly. The transfer gear of the transfer gear assembly engages the bevel-spur gear assembly of the drive shaft assembly.

The air piston is mounted on the support shaft. The clutch plate is fixed to the housing such that it remains stationary. The clutch feed gear is positioned on the support shaft under the clutch plate. The transfer gear is mounted independently of the support shaft. A spring separates the clutch feed gear and the transfer gear.

The clutch feed gear is engaged to the feed gear at all times. When the clutch feed gear is engaged with the clutch plate, it is held fixed and prevented from rotation under spring load, thus also preventing the feed gear from rotation. However, when the clutch feed gear rotates the feed gear rotates. When the air piston is compressed by pressure, it pushes the support shaft down, causing the clutch feed gear to disengage from the clutch plate and to engage with the transfer gear. The transfer gear rotates the clutch feed gear. The transfer gear will also rotate the drive gear.

The drill spindle assembly comprises of a cutter spindle, a feed gear, and a drive gear. The drill spindle assembly is mounted in engagement with the transfer gear assembly. The drive gear is attached to the cutter spindle, such that when the drive gear rotates the spindle will rotate either up or down, which it depends on the position of the clutch feed gear. The drive gear spins by engagement with the transfer gear of the transfer gear assembly. The feed gear, mounted on top of the drive gear which is threaded to the cutter spindle. This threaded engagement feed the cutter spindle when the feed gear rotates and when the feed gear is fixed from rotation the cutter spindle retracts.

The head attachment also includes a non-swivel or swivel nosepiece adapter. The swivel nosepiece adapter has tapered holes arranged radially to receive a tapered lock pin. When the swivel nosepiece index the drill in position for drilling, the tapered lock pin prevents the nosepiece adapter from rotational movement and in turn will hold the tool rigidly in a position for drilling operation.

The air motor housing assembly contains the pneumatic logic network for controlling the operation of the drill. The air motor housing assembly comprises of a main air valve, delay valve, start pilot valve, stop pilot valve, retract pilot valve, shut-off valve, retract valve, and air motor. The air motor housing assembly is enclosed in a housing, having a control panel side and a port panel on the opposite side. There are four ports that relay pneumatic signals to the head attachment to regulate drilling operation.

FIG. 12 shows the pneumatic logic control system of the air motor housing assembly in stand-by mode. A source of air pressure enters the main air valve to pressurize the start pilot valve, the stop pilot valve and the retract pilot valve.

In order to the feed cutter spindle, two steps must occur. First, the air motor must be powered to drive the gear assemblies in the head attachment. Second, pneumatic pressure must be supplied to the transfer gear assembly in the head attachment so that clutch feed gear engages the transfer gear, thereby enabling the feeding operation of cutter spindle.

When the start pilot button is depressed, the air piston of the main air valve is pushed down by the pneumatic pressure. When the air piston in main air valve is down, it opens a port to supply air pressure which powers the air motor. The operation of the air motor powers the output spindle, which in turn drives the head attachment in either the "right-angle" mode or "in-line" mode. Specifically, in the "in-line" mode, the output spindle is received in the splined end of drive shaft in the head attachment. Rotation of drive shaft causes rotation of the bevel-spur gear assembly, which drives the transfer gear. The transfer gear drives the drive gear to spin the cutter spindle. In the "right-angle" mode, the output spindle is received in the drive bevel gear. Rotation of the drive bevel gear likewise causes rotation of the transfer gear to power the drive gear for driving the cutter spindle.

In order for rotation of the transfer gear to effectuate feeding of the cutter spindle, the transfer gear must engage the clutch feed gear. When the clutch feed gear and the transfer gear are engaged, the transfer gear drives the clutch feed gear, which in turn drives the feed gear on the spindle assembly. The feed gear rotates to feed the cutter spindle through their threaded engagement.

The cutter spindle can be manually or automatically retracted. The cutter spindle is automatically retracted at the end of the feed operation. At the end of the feeding operation, movement of the cutter spindle causes an automatic retract pilot valve in the head attachment to communicate with the retract valve in the air motor housing assembly to exhaust pressure in the transfer gear assembly in the head attachment. This causes the spring to disengage the clutch feed gear from the transfer gear and to engage with the clutch plate. This stops the clutch feed gear from rotation and in turn the feed gear is held fixed, thereby resulting in retraction of the cutter spindle.

To manually retract the cutter spindle the retract pilot valve in the air motor assembly is actuated. When the retract pilot button is depressed it will communicate with the retract valve in the air motor housing assembly which will result in the release of pressure behind the air piston of the transfer gear assembly in the head attachment. This causes the clutch feed gear to disengage from the transfer gear. As a result, the clutch feed gear is locked by the clutch plate, resulting in the retraction of the cutter spindle.

At the end of the cycle, movement of the cutter spindle causes an automatic stop pilot valve in the head attachment to signal the shut off valve in the air motor housing assembly to open to exhaust. As a result, the air piston in the main air valve rises, thereby closing the port to the air motor. This cuts off pressure to air motor and results in its stoppage.

To manually shut down operation of the drill, the stop pilot valve in the air motor housing assembly is depressed it will also signal the shut off valve in the air motor housing assembly to open to exhaust. This results in the release of the air pressure behind the air piston in the main air valve, thereby closing the port of main air valve to the air motor, thus shutting off air supply to the air motor. Accordingly, the air motor shuts down and operation ceases.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 2:
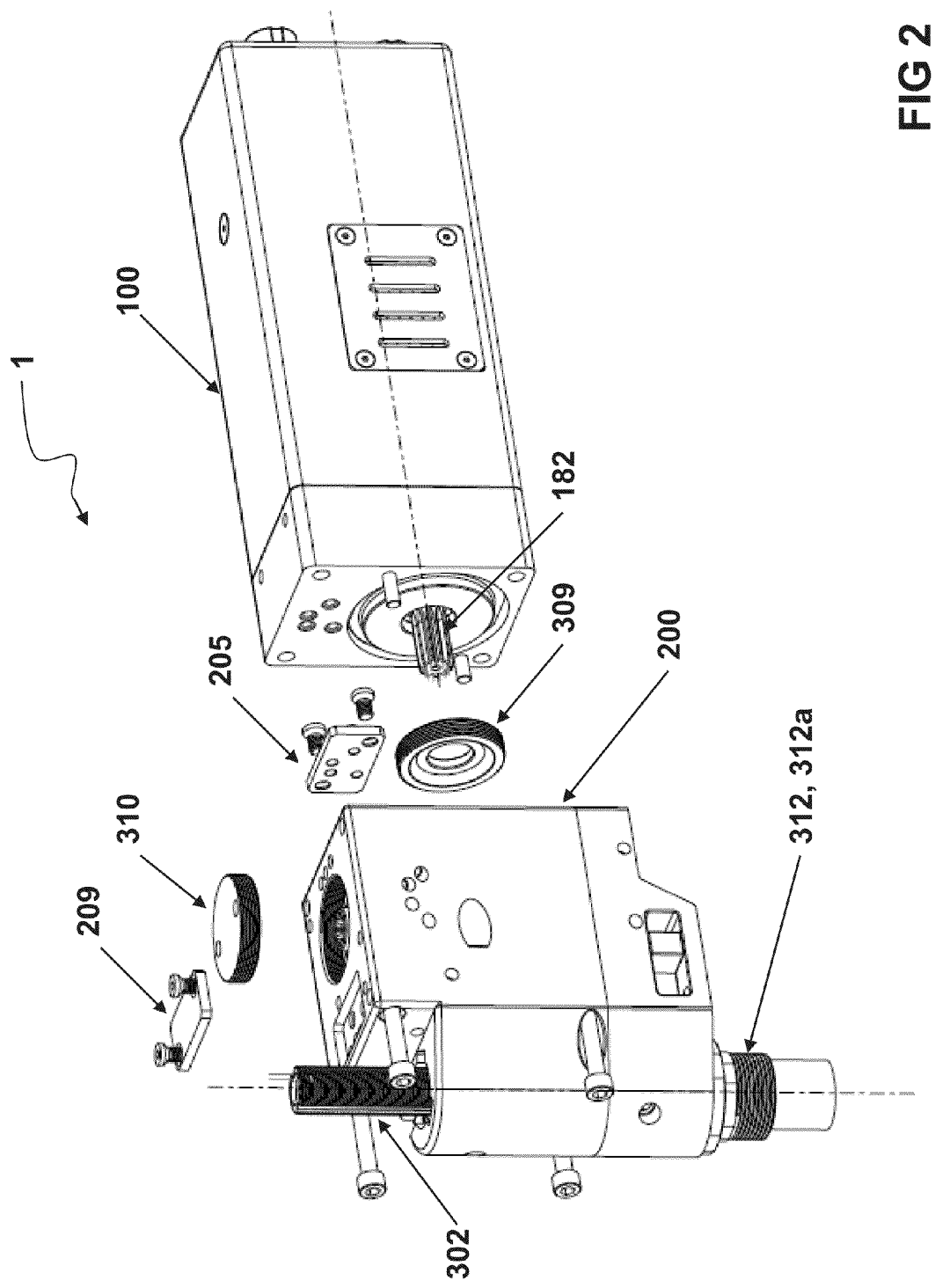
FIG. 2 is an exploded view of the drilling tool in the "right-angle" mode, showing the head attachment separated from the air motor housing assembly.
Figure 3:
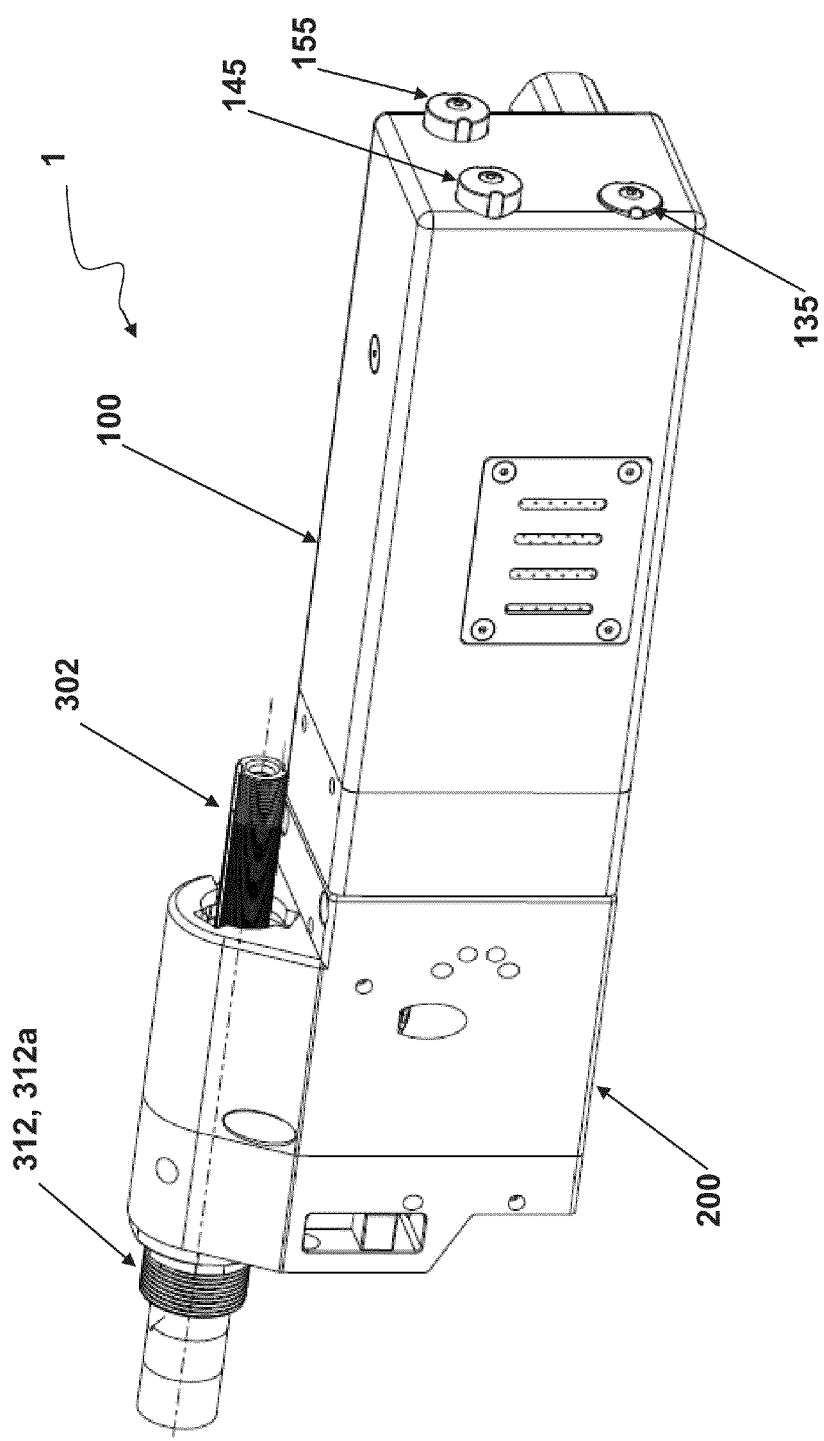
FIG. 3 is a perspective view of a drilling tool according to an embodiment of the present invention, showing the drilling tool in the "in-line" mode.

As shown in FIG. 2, a positive feed drill 1 according to a preferred embodiment of the invention comprises of an air motor housing assembly 100 and a head attachment 200 having cutter spindle 302. Drill 1 is capable of operation in two modes. It can be configured to operate in a "right-angle" mode as shown in FIG. 2, wherein the axis of cutter spindle 302 is perpendicular to the axis of air motor housing assembly 100. It can also be configured to operate in an "in-line" mode as shown in FIG. 3, wherein the axis of cutter spindle 302 is parallel to the axis of air motor housing assembly 100.

Figure 4:
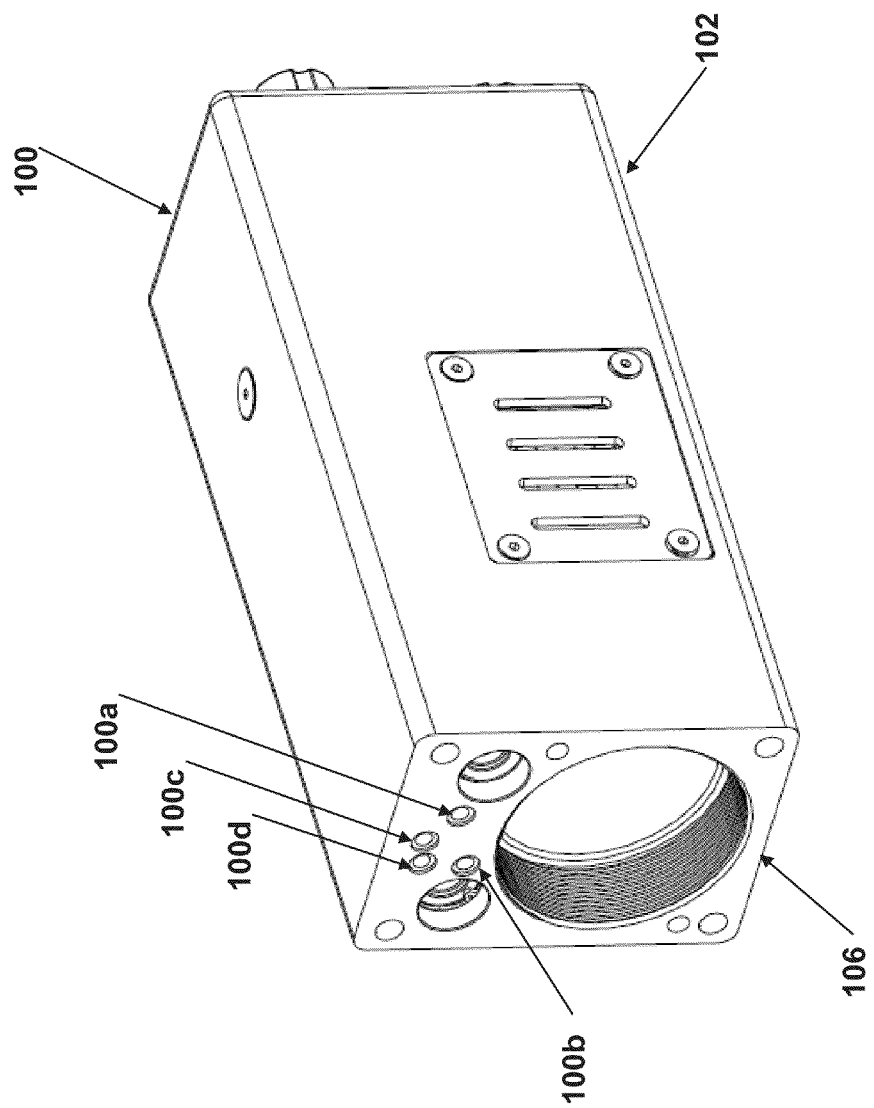
FIG. 4 is a perspective view of the air motor housing assembly, showing the port panel side.
Figure 12:
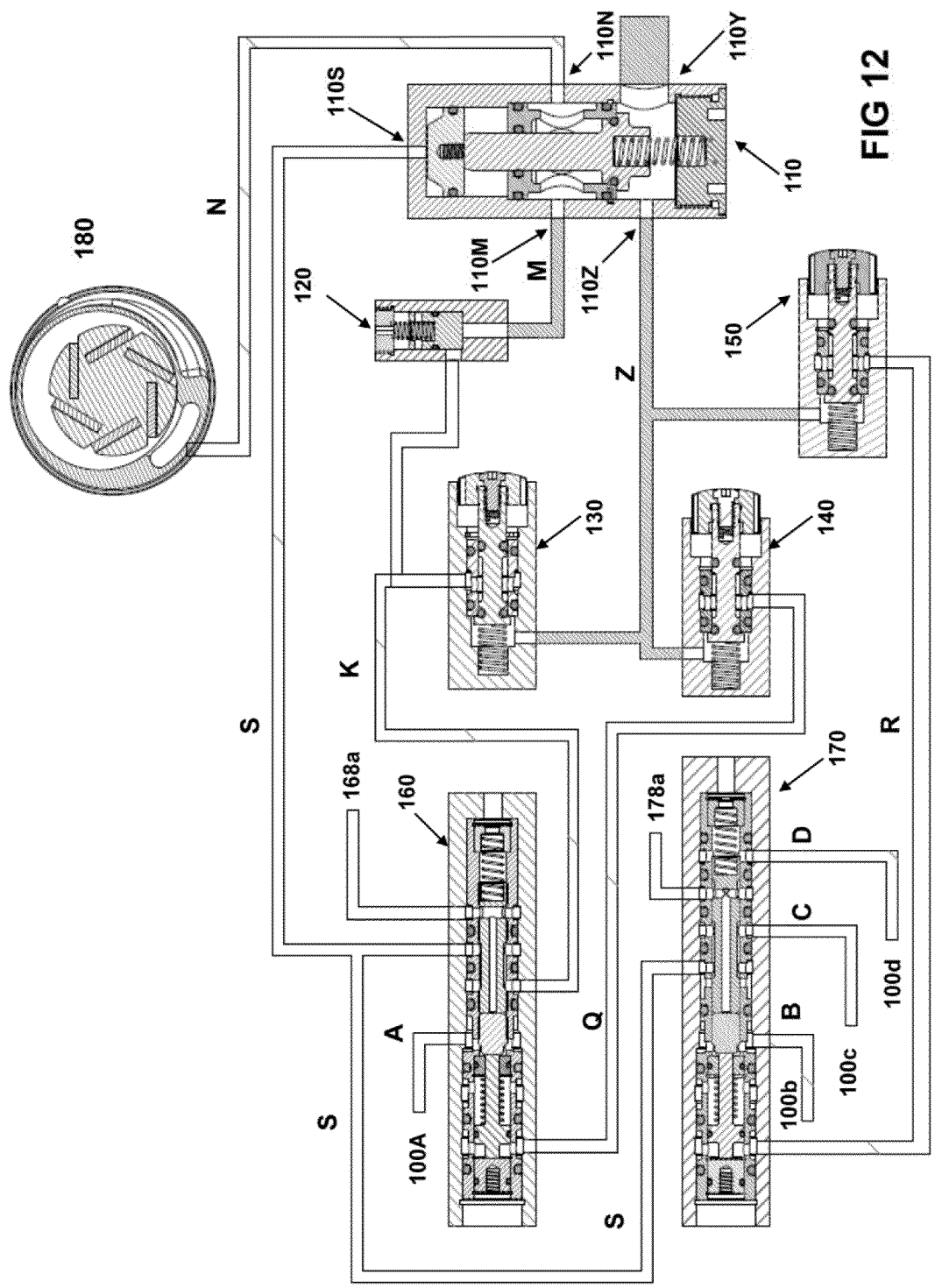
FIG. 12 is a schematic of the pneumatic logic control of the air motor housing assembly in stand-by mode.

Air motor housing assembly 100 contains the pneumatic logic network as shown in FIGS. 12-20 for controlling the operation of drill 1. Referring to FIG. 12, air motor housing assembly 100 comprises of a main air valve 110, delay valve 120, start pilot valve 130, stop pilot valve 140, retract pilot valve 150, shut-off valve 160, retract valve 170, and an air motor 180. Air motor housing assembly 100 is enclosed in a housing 102 (FIG. 4), having a control panel side 104 (FIG. 5) and a port panel on opposite side 106 (FIG. 4). The operational buttons of start pilot valve 130, stop pilot valve 140, and retract pilot valve 150 are located on control panel side 104. Ports 100A, 100B, 100C, and 100D, which relay pneumatic signals to head attachment 200 to regulate drilling operation, are located on port panel side 106 as shown in FIG. 4. Because different materials require different spindle RPM and different feed rates for optimal drilling and reaming conditions, one of skill in the art would recognize that drill 1 can be operated with different gear reducers having different gear ratios to provide the proper RPM for drilling.

Figure 1:
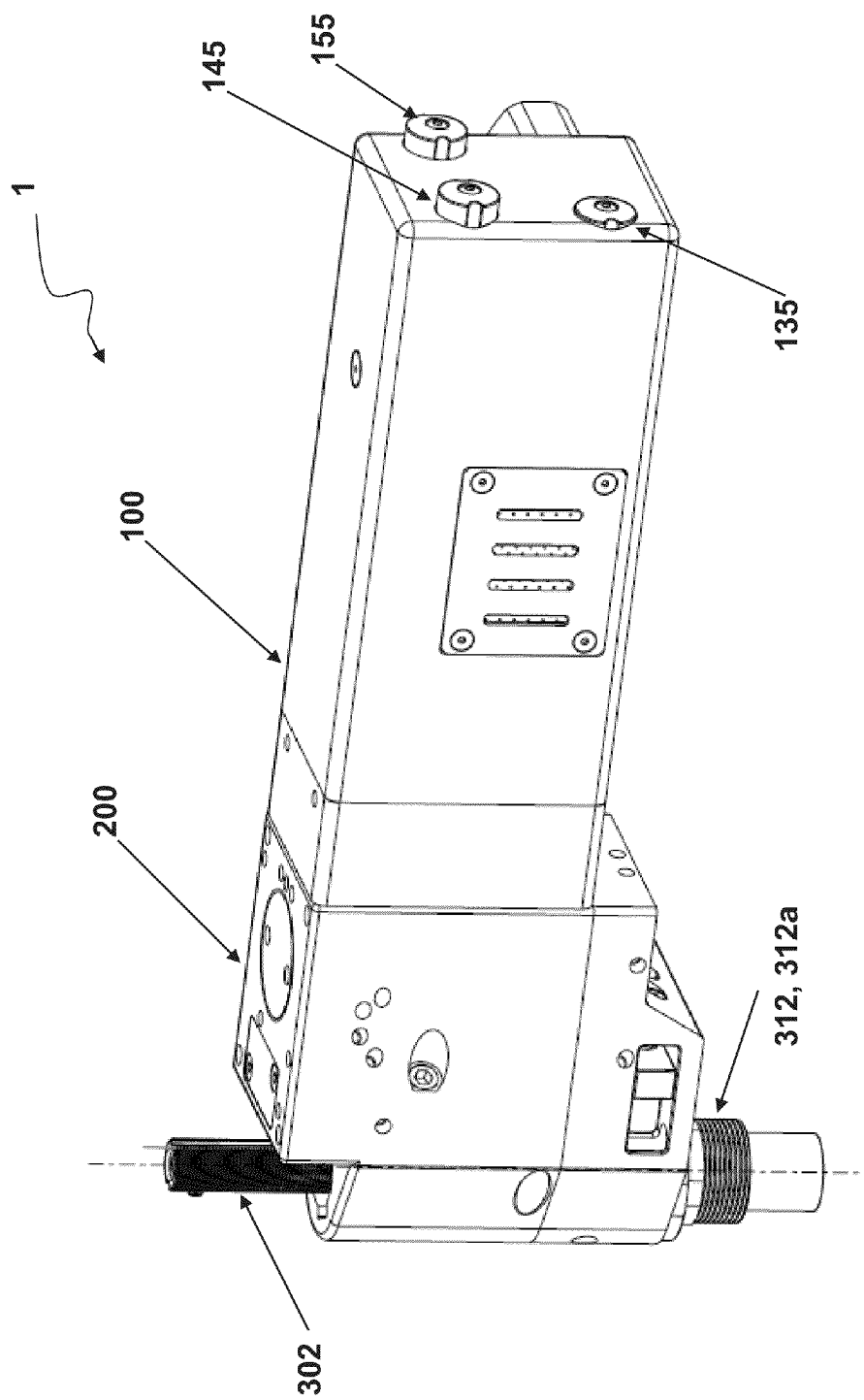
FIG. 1 is a perspective view of a drilling tool according to an embodiment of the present invention, showing the drilling tool in the "right-angle" mode.
Figure 21:
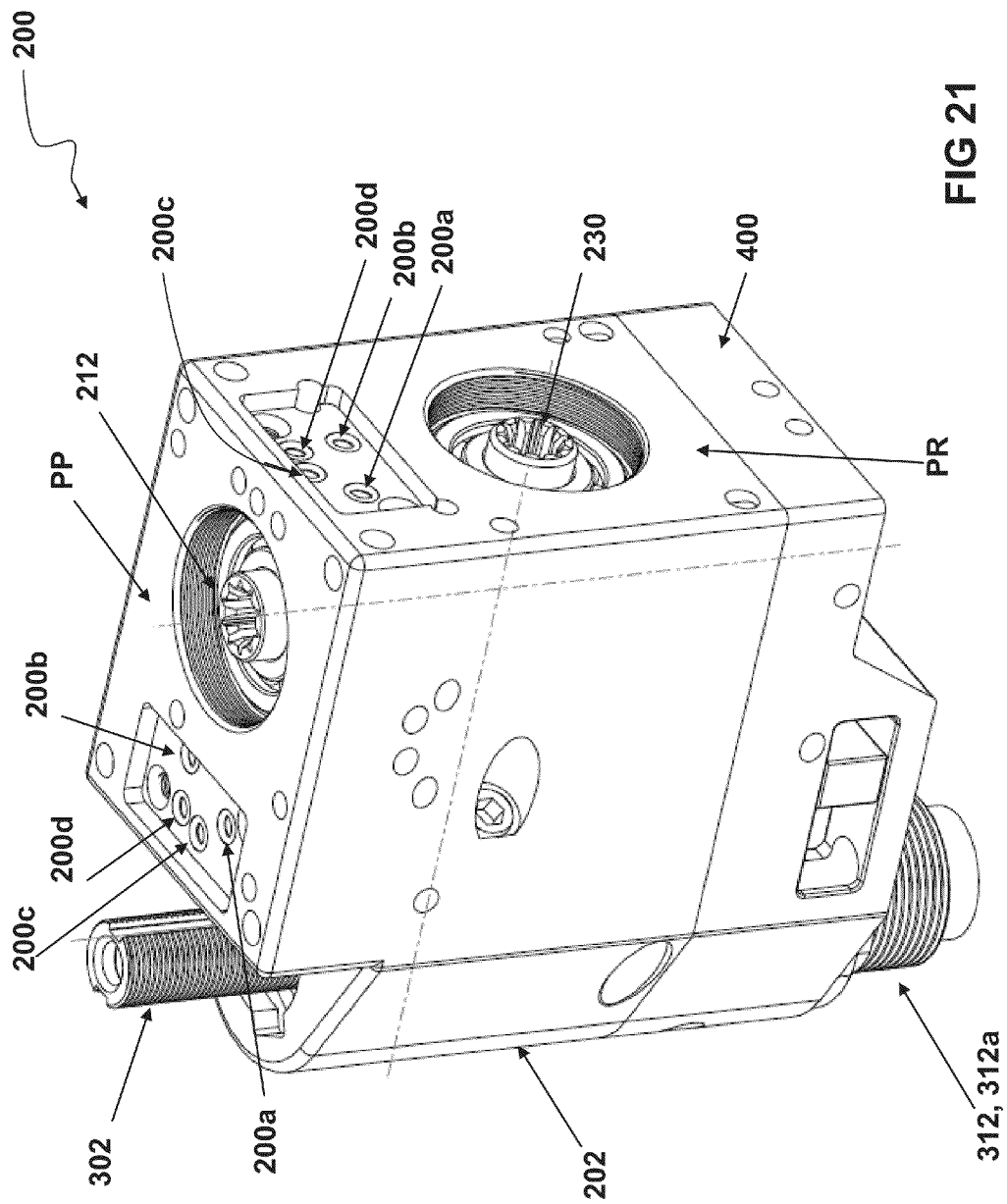
FIG. 21 is a perspective view of the head attachment, showing faces PP and PR.
Figure 23:
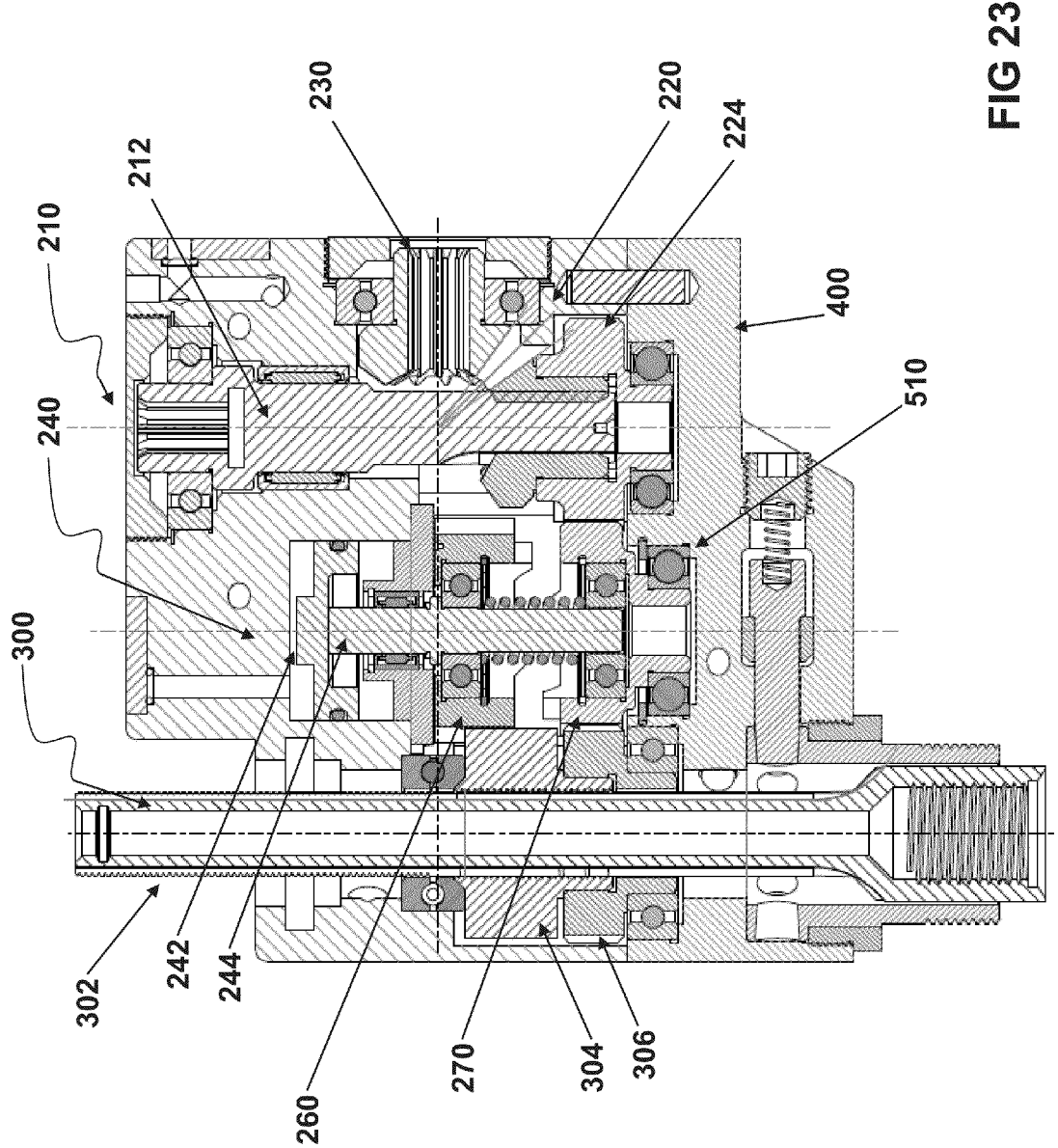
FIG. 23 is a cross-sectional view of the head attachment and the lower housing unit.
Figure 32:
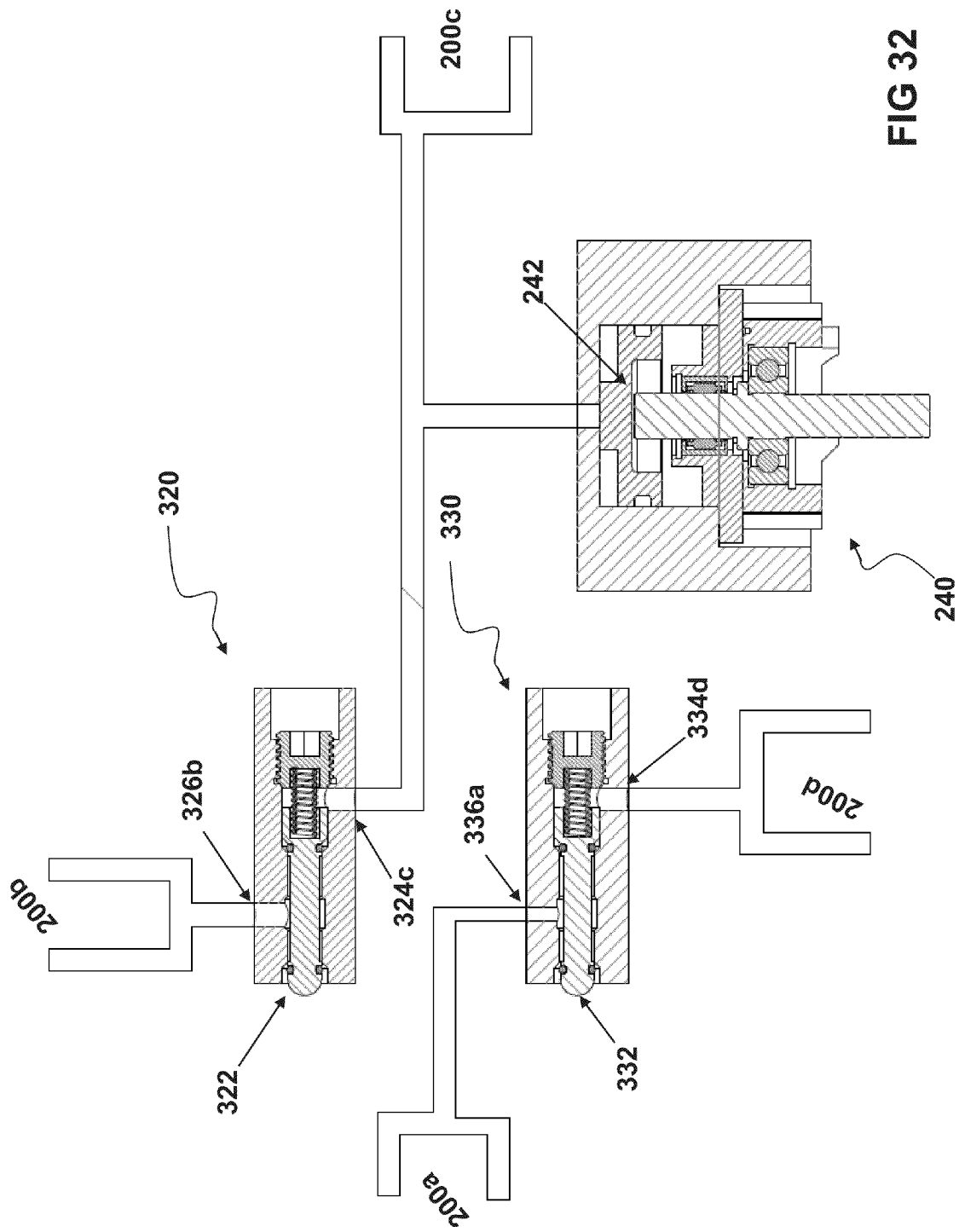
FIG. 32 is a schematic of the pneumatic logic control in the head attachment, showing the automatic retract pilot valve and the automatic stop pilot in stand-by mode.

Referring to FIG. 23, and FIG. 32, head attachment 200 comprises of a drive shaft assembly 210, a transfer gear assembly 240, a drill spindle assembly 300, a swivel nosepiece adapter 312, automatic retract pilot valve 320 (FIG. 32), automatic stop pilot valve 330 (FIG. 32). As shown in FIG. 21, head attachment 200 is enclosed in housing 202, having a face PP and a face PR, the two faces being orthogonal to each other, for mating with air motor housing assembly 100. For the air motor assembly 100 to engage with face PR in the "right-angle" mode as shown in FIGS. 1-2, the spindle cover plate 309 and pneumatic cover plate 205 is placed on face PR while the spindle cover plate 310 and the pneumatic cover plate 207 is placed on face PP. Similarly, for the air motor assembly 100 to engage with face PP for the "in-line" mode as shown in FIG. 3, the spindle cover plate 309 and pneumatic cover plate 205 is placed on face PP while spindle cover plate 310 and pneumatic cover plate 207 is place on face PR. As best shown in FIG. 21, face PP and face PR each have ports 200A, 200B, 200C, and 200D that correspond to ports 100A, 100B, 100C, and 100D in the air motor housing assembly 100 (FIG. 4).

Figure 5:
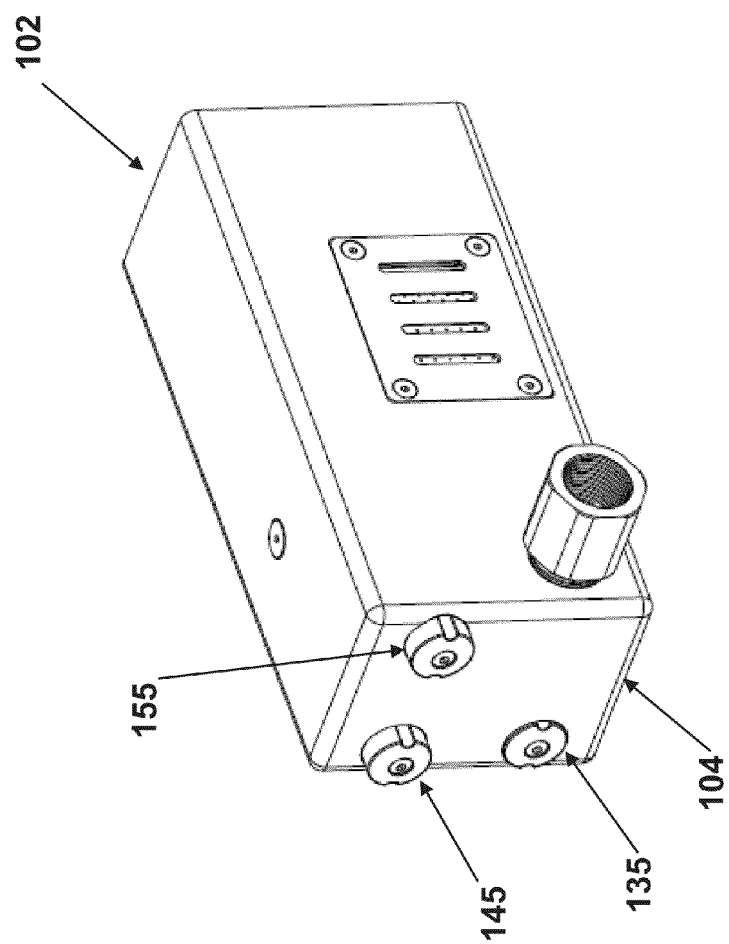
FIG. 5 is a perspective view of the air motor housing assembly, showing the control panel side.

Drill 1 is activated by pushing the start button 135 (FIG. 5) on start pilot valve 130 (FIG. 12) to start air motor 180 (180). Air motor 180 has an output spindle 182 (FIG. 2) that drives gears in head attachment 200 to feed and retract cutter spindle 302 (FIG. 1) as described more fully below. At the end of a predetermined feed stroke the drill 1 will automatically retract and at the end of the retract cycle the drill will automatically shut off. The drill 1 can be manually stopped at any point of the cycle by pushing stop button 145 (FIG. 5). It can also be manually retracted at any given point of the cycle by pushing retract button 155 (FIG. 5).

Referring to FIG. 12, air motor housing assembly 100 comprises of a main air valve 110, delay valve 120, manual start pilot valve 130, manual stop pilot valve 140, retract pilot valve 150, shut-off valve 160, retract valve 170, and air motor 180. Air motor housing assembly 100 can include or be coupled to a gear reducer of a type known in the art.

Start pilot valve 130, stop pilot valve 140, and retract pilot valve 150 are mounted with their respective actuation buttons 135, 145, 155 located on control panel side 104 of air motor housing 102 as shown in FIG. 5. The start pilot valve button 135 is recessed to prevent accidental start-up. The stop pilot valve button 145 and retract pilot valve button 155 are protruded to provide easy access for emergency stop and retraction.

Figure 9:
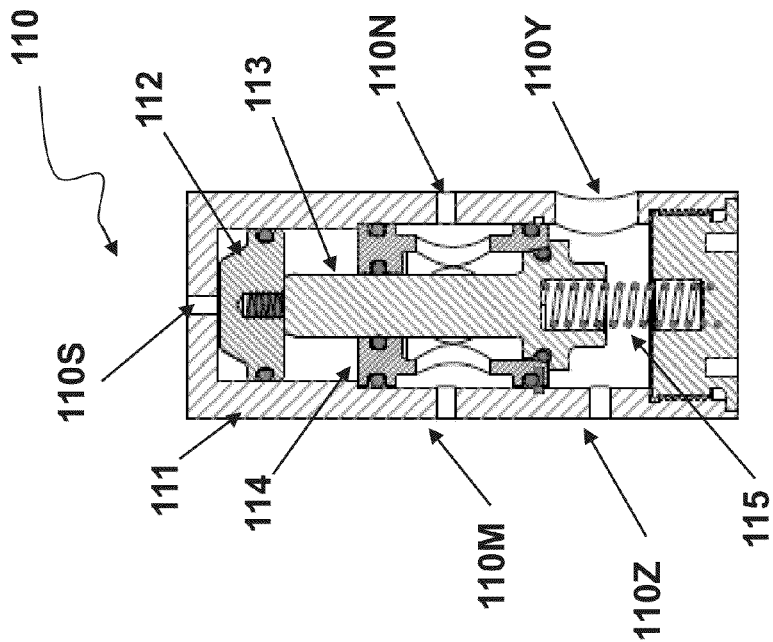
FIG. 9 is a cross-sectional view of the main air valve.

Main air valve 110 is shown in FIG. 9. Main air valve 110 comprises of a main air valve body 111 that houses air piston 112, valve stem 113, valve sleeve 114, and spring 115. Spring 115 urges valve stem 113 against valve sleeve 114 to seal its inlet port from its outlets ports. Main air valve 110 has inlet port 110Y, and ports 110Z, 110M, 110N, and 110S that correspond to pneumatic lines Z, M, N, and S as shown in FIG. 12. Pneumatic line Z is pressurized upon connecting the tool to an air supply and will stay pressurized all the times.

Referring to FIG. 12, port 110Z connects main air valve 110 via pneumatic line Z to start pilot valve 130, stop pilot valve 140, and retract pilot valve 150. Port 110M connects main air valve 110 via pneumatic line M to delay valve 120. Port 1 ION connects main air valve 110 via pneumatic line N to air motor 180. Port 110S connects main air valve 110 via pneumatic line S to shut off valve 160 and retract valve 170.

Figure 8:
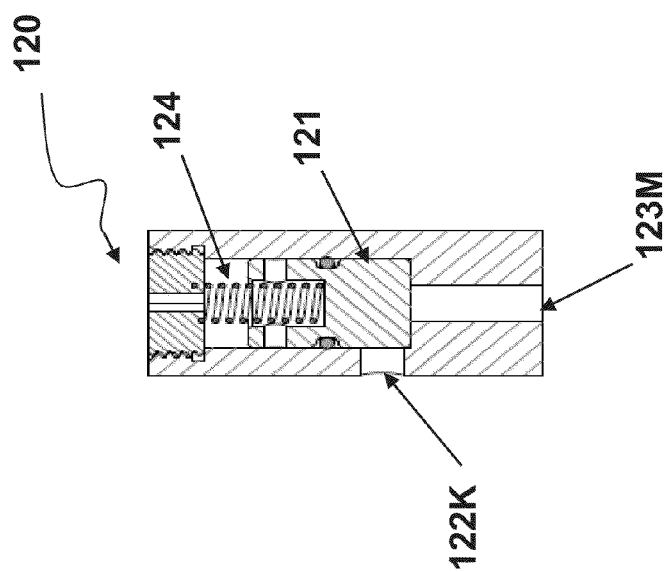
FIG. 8 is a cross-sectional view of the delay valve.

Delay valve 120 is shown in FIG. 8. Delay valve 120 has spool 121 and spring 124 that regulate an outlet port 122K and an inlet port 123M that corresponds to pneumatic lines K and M respectively as shown in FIG. 12. Inlet port 123M of delay valve 120 is connected to outlet port 110M of main air valve 110.

The air motor 180, a type known in the art, comprises of a cylinder, a rotor and vanes. In a standby condition, the vanes sits inside the rotor, not making contact with the internal diameter of the cylinder, thus creating a small gap that could allows an air leakage between the inlet port, connected to line N, and exhaust port of the air motor 180. Consequently, when the air motor 180 rotates, the vanes are extended making contact with the internal diameter of the cylinder, thus now creating a seal between the inlet and exhaust port of the air motor 180.

Delay valve 120 functions to separate line K from lines M and N, when air motor 180 is not running, and prevents air pressure leakage through the air motor 180. As a result, when the start pilot valve 130 is depressed, maximum air pressure in line S is developed to push down the air piston 112 of main air valve 110 against the spring 115 and air inlet pressure.

After the main air valve is activated line N will be pressurized to power the air motor 180. Also line M will be pressurized to activate the delay valve; as a result line M will connect with line K to supply air pressure through the delay valve to the pneumatic logic during the entire cycle. After this moment the start pilot valve can be released and the automatic cycle of the drill 1 continues.

Figure 6:
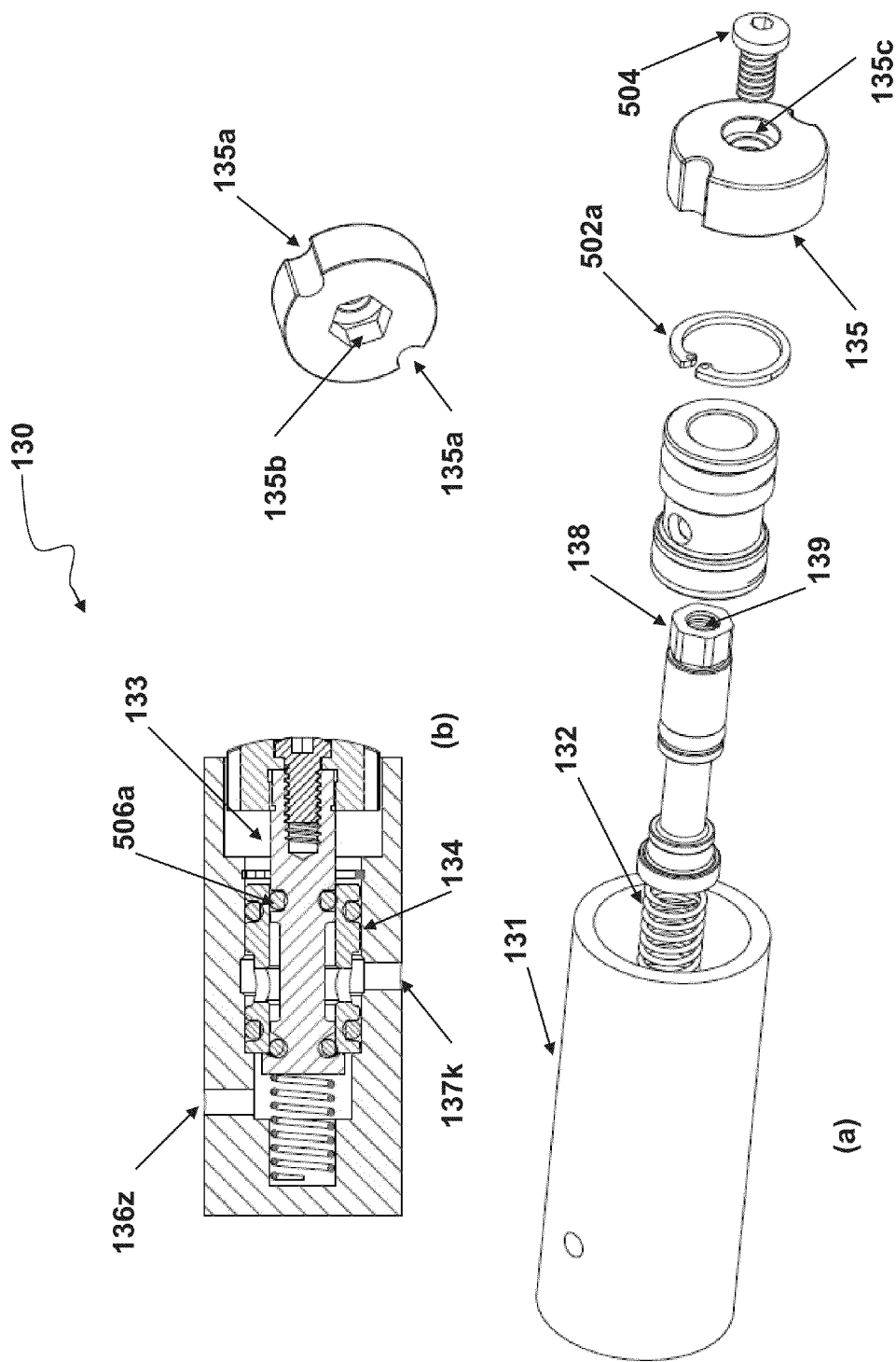
FIG. 6a is an exploded view of the start pilot valve.
FIG. 6b is a cross-sectional view of the start pilot valve.

Referring to FIGS. 6(a)-(b), start pilot valve 130 comprises of a valve body 131 that houses spring 132, valve stem 133, valve sleeve 134, button 135, and screw 504. Valve body 131 has inlet port 136z and outlet port 137k. The valve sleeve 134 is held between an internal shoulder of valve body 131 and a retaining ring 502a as shown. Spring 132 urges valve stem 133 against valve sleeve 134 to seal inlet port 136z from outlet port 137k. Button 135 has a channel 135a and also has a counter bore 135c where screw 504 nests inside to be flush and match with the contour of button 135 such that will not create a pinch point for the operator of the drill 1. Button 135 also has an internal hex 135b that engages the external hex 138 of valve stem 133, so that when the button 135 is held from rotation, the valve stem 133 will also be held from rotation.

Button 135 is secured to the valve stem 133 by screw 504, since button 135 is recessed inside a counter bore of the air motor housing and there is no mean to hold button 135 from rotation, therefore a spanner wrench is used in channels 135a to hold button 135 from rotation. The hex engagement between the valve stem 133 and button 135 prevent valve stem 133 from rotation while threading screw 504 into the internal thread 139 of the valve stem 133.

Another purpose of channels 135a of button 135 is that it will allow air in the pocket behind the button 135 to exhaust to atmosphere. Inlet port 136z communicates with line Z (FIG. 12), which connects start pilot valve 130 with main air valve 110. Outlet port 137k communicates with line K (FIG. 12), which connects start pilot valve 130 with shut off valve 160 and delay valve 120. The start pilot valve 130 has a front O-ring 506a on valve stem 133 that seals outlet port 137 at all times to prevent line K from venting to atmospheric pressure during operation of the drill 1.

Figure 7:
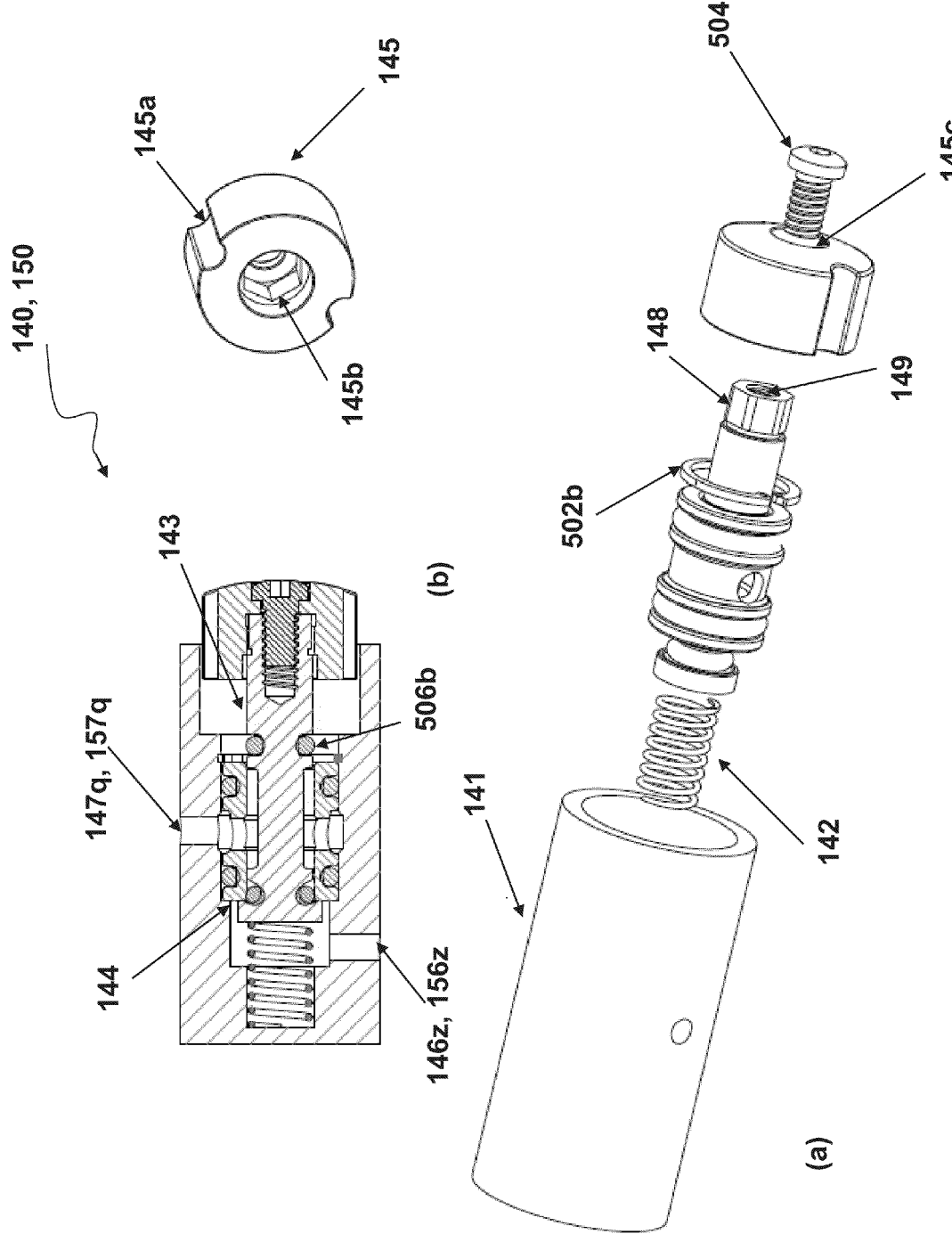
FIG. 7a is an exploded view of the stop/retract pilot valves.
FIG. 7b is a cross-sectional view of the stop/retract pilot valves.

Stop pilot valve 140 and retract pilot valve 150 are identical in construction and are both similar in construction to start pilot valve as shown in FIG. 7(a)-(b).

Stop pilot valve and retract pilot valve 140 and 150, each comprise of valve body 141 that houses spring 142, valve stem 143, valve sleeve 144, and button 145. The valve sleeve 144 is held between an internal shoulder of valve body and a retaining ring 502b as shown. Spring 142 urges valve stem 143 against valve sleeve 144 to seal its inlet port from its outlet port.

Button 145 has a channel 145a and also has a counter bore 145c where screw 504 nests inside to be flush and match with the contour of button 145 such that will not create a pinch point for the operator of the drill 1. Button 145 also has an internal hex 145b that engages the external hex 138 of valve stem 143, so that when the button 145 is held from rotation, the valve stem 13 will also be held from rotation.

Button 135 is secured to the valve stem 133 by screw 504, since button 145 is partially recessed inside a counter bore of the air motor housing and there is no mean to hold button 145 from rotation, therefore a spanner wrench is used in channels 145a to hold button 145 from rotation. The hex engagement between the valve stem 143 and button 145 prevent valve stem 143 from rotation while threading screw 504 into the internal thread 149 of the valve stem 143.

The channels 145a of button 145 allow air behind the button 145 to exhaust to atmosphere. Valve stem 143 has a front O-ring 506*b* to seal outlet port when button 145 is depressed and will unseal the outlet port to release the residual (trapped) in the pneumatic line that leads to outlet port.

Inlet port 146*z* of stop pilot valve 140 communicates with line Z, which connect stop pilot valve 140 with main air valve 110. Outlet port 147*q* communicates with line Q which connect stop pilot valve to shut off valve 160.

Inlet port 156*z* of retract pilot valve 150 communicates with line Z, which connect retract pilot valve 150 with main air valve 110. Outlet port 157*q* communicates with line R which connect stop pilot valve to retract valve 170.

Figure 10:
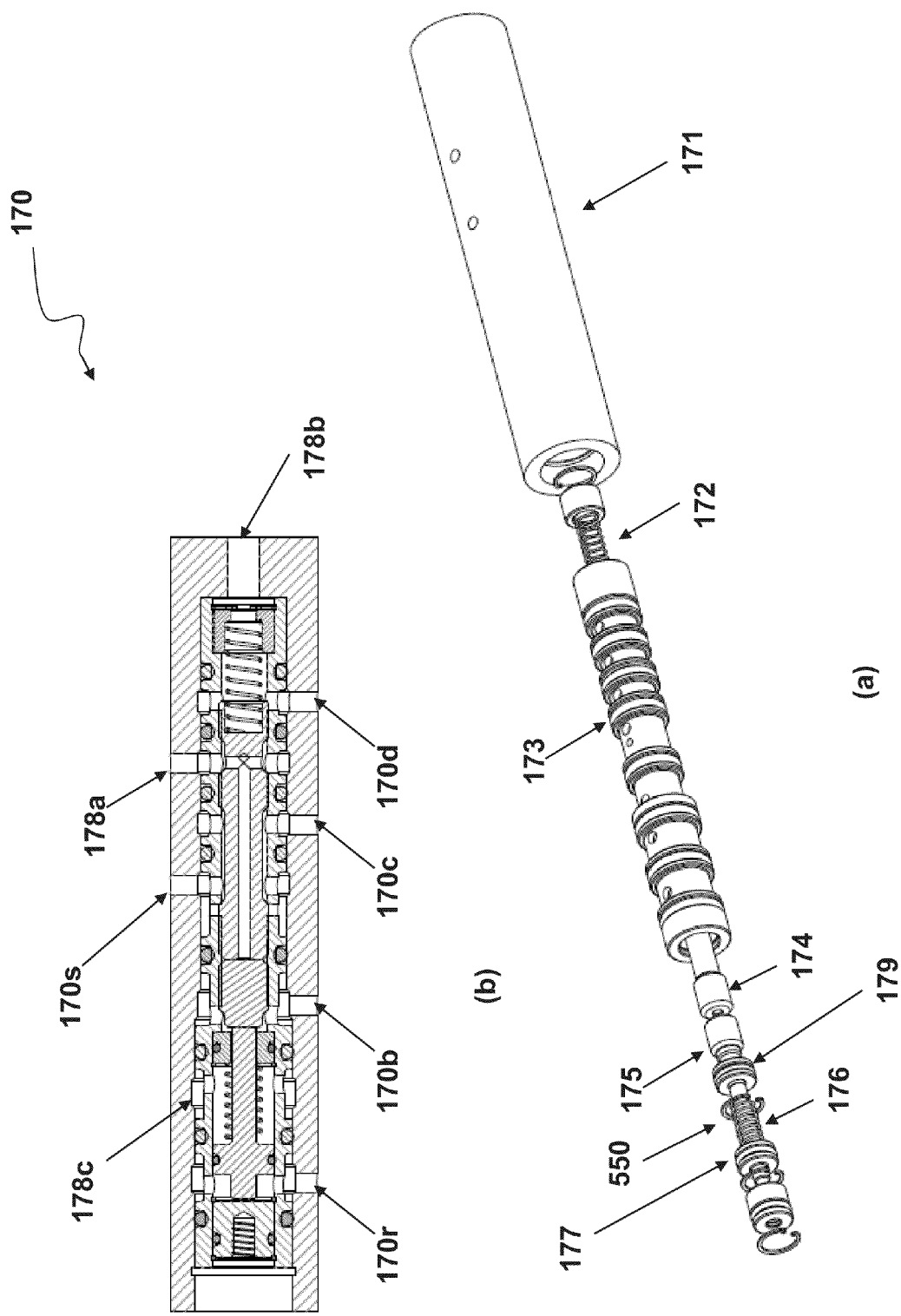
FIG. 10a is an exploded view of the retract valve.
FIG. 10b is a cross-sectional view of the retract valve.
FIG. 10c is a cross-sectional view of the retract valve when it receives a signal from port 170b.
FIG. 10d is a cross-sectional view of the retract valve when it receives a signal from port 170r.
FIG. 10e is a cross-sectional view of the retract valve when the signal from either port 170r or port 170b is cut off.
Figure 10:
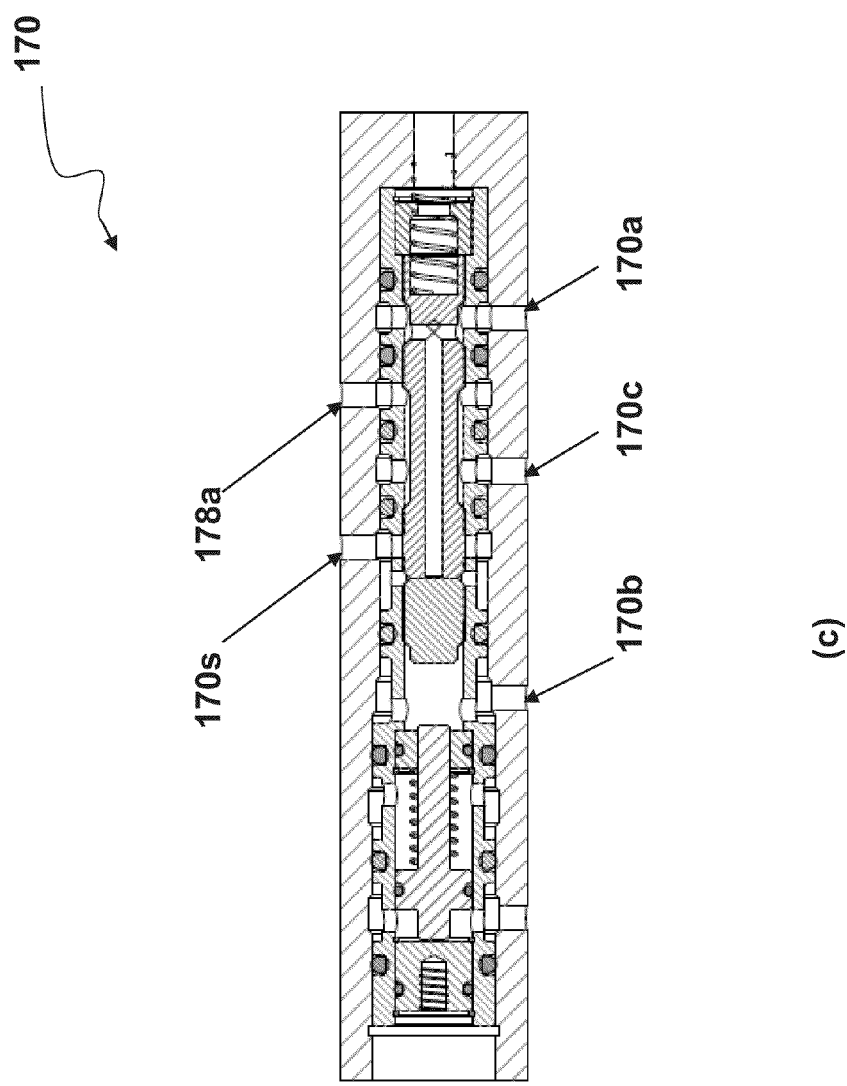
Figure 10:
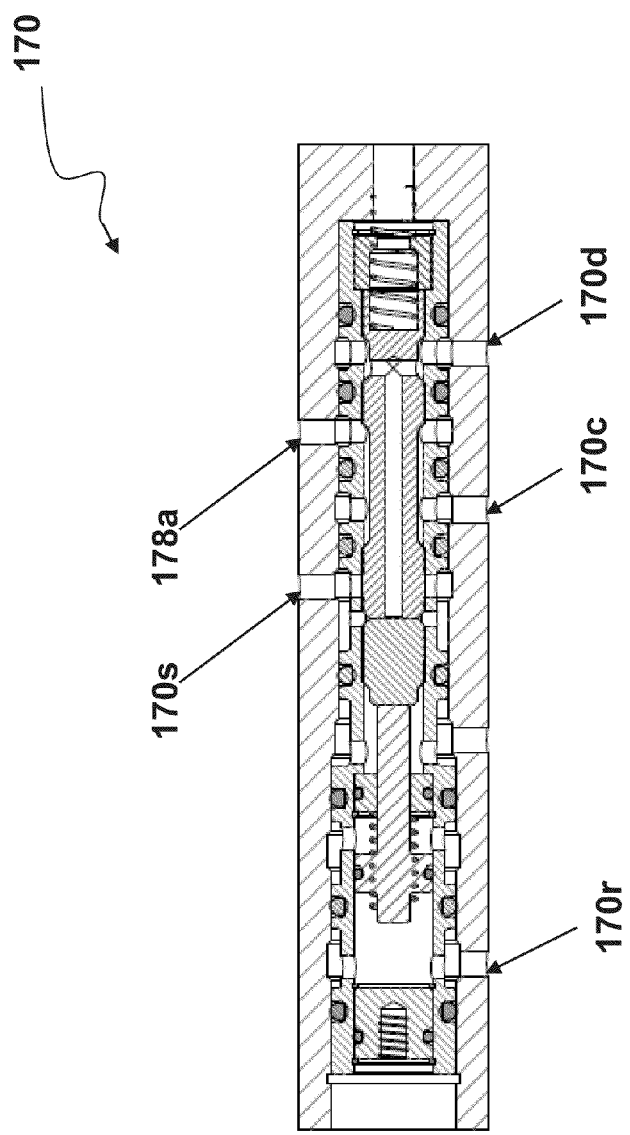
Figure 10:
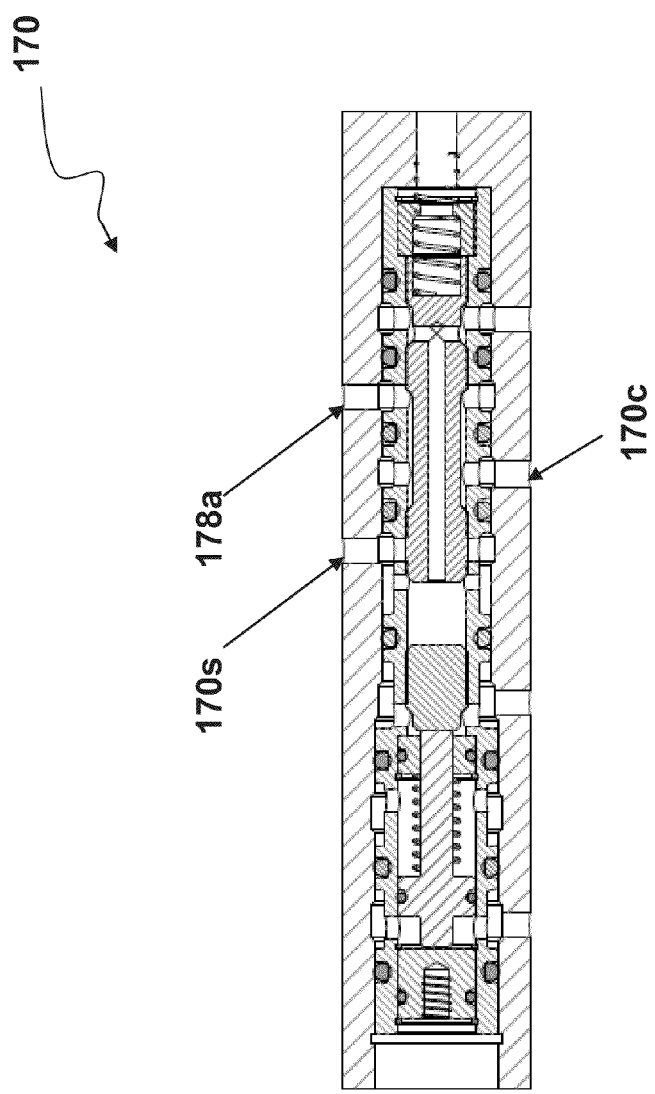

Retract valve 170 has a construction substantially similar to shut off valve 160. Referring to FIG. 10(*a*) and FIG. 10(*b*), retract valve 170 comprises of a retract valve body 171 that houses first spring 172, valve sleeve 173, long valve spool 174, short valve spool 175, bulk head 179, retaining ring 550, second spring 176, and air piston 177. Bulk head 179 is held between an internal shoulder of valve body 171 and retaining ring 550. Second spring 176 acts between bulk head 179 and air piston 177 to keep the air piston 177 in forward position in the absence of the air pressure. The cavity that houses the second spring 176 is open to atmosphere through exhaust port 178*c* to allow air piston 177 to move forward against the second spring 176 when port 170*r* is pressurized. When port 170*b* receives an air pressure signal from automatic retract pilot valve 320 in the head attachment, the close fit between the internal diameter of the bulk head 179 and the rod of air piston 177 seals port 170*b* from exhaust port 178*c*.

Retract valve 170 has ports 170*b*, 170*c*, 170*d*, 170*r* and 170*s* that corresponds with pneumatic lines B, C, D, R and S, respectively. In addition, retract valve 170 has exhaust ports 178*a*, 178*b* and 178*c*.

Referring to FIGS. 10 and 12, port 170*b* communicates with pneumatic line B, which connects to port 100*b* (see FIG. 4) at the port panel of the air motor assembly 100 which then corresponds to port 200*b* (see FIG. 21) in head attachment 200. Port 170*c* communicates with pneumatic line C, which connects to port 100*c* on the port panel of the air motor assembly 100 which then corresponds to port 200*c* in head attachment 200. Port 170*d* communicates with pneumatic line D, which connects to port 100*d* on the port panel of the air motor assembly 100 which then corresponds to port 200*d* in head attachment 200. Port 170*r* communicates with pneumatic line R, which connects to retract pilot valve 150. Port 170*s* communicates with pneumatic line S, which connects to shut-off valve 160 and main air valve 110.

Figure 16:
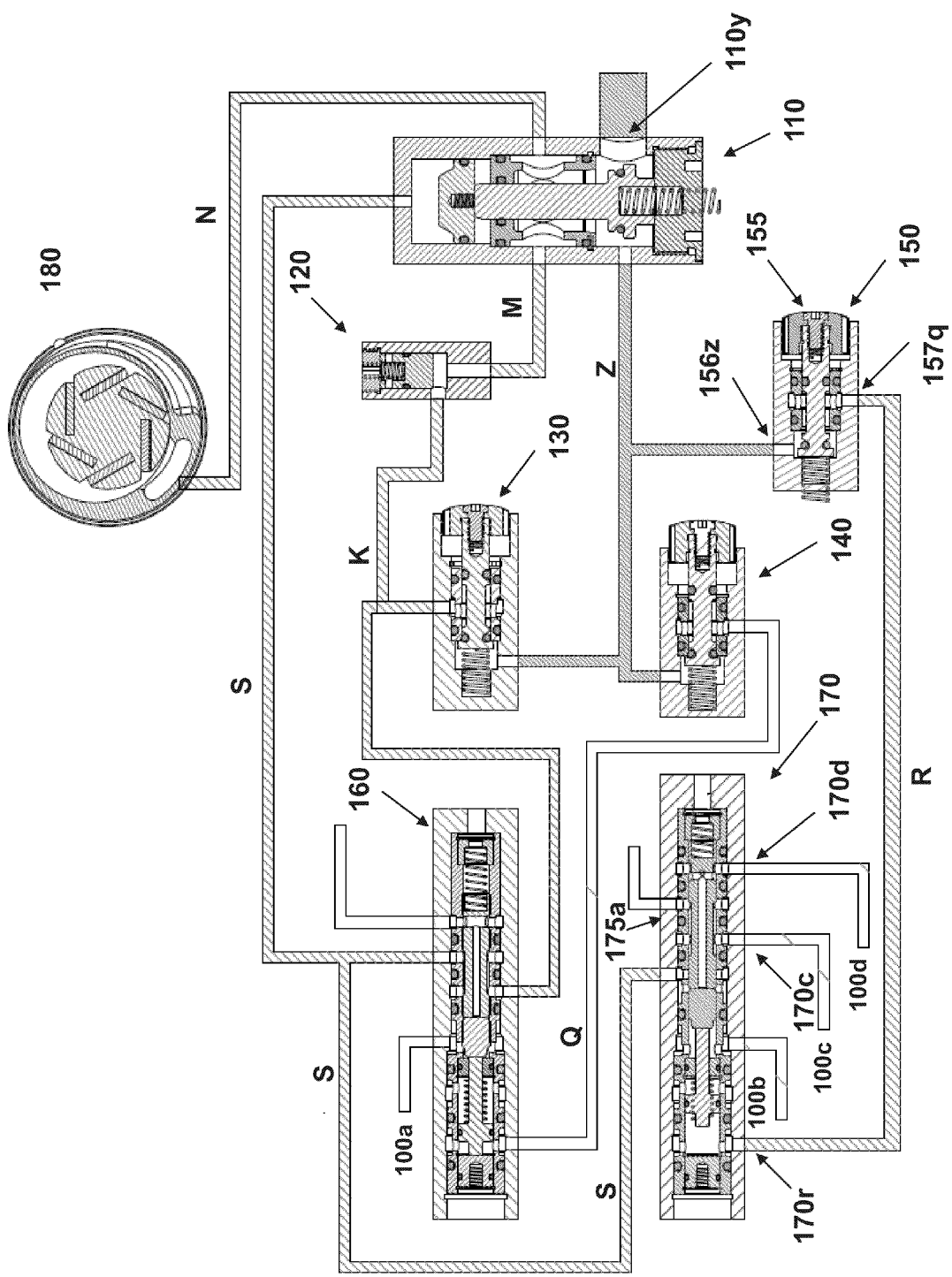
FIG. 16 is a schematic of the pneumatic logic control of the air motor housing assembly when retract pilot valve is depressed.
Figure 17:
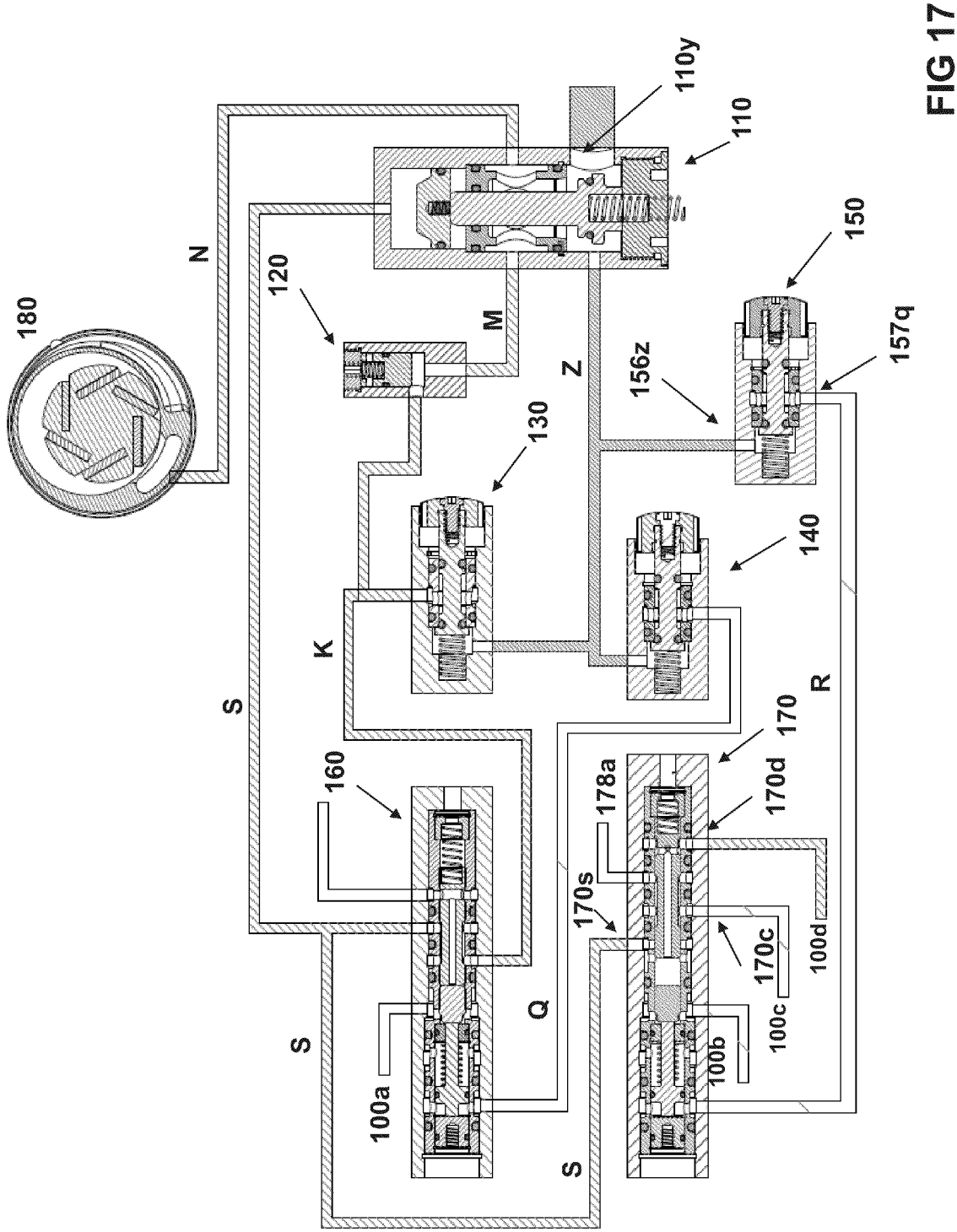
FIG. 17 is a schematic of the pneumatic logic control of the air motor housing assembly when retract pilot valve is released.

When retract valve 170 is in a neutral state as shown in FIG. 10, first spring 172 operates to keep short valve spool 175 and long valve spool 174 in a forward position in the absences of air pressure. In this position, port 170*s* and port 170*c* are open. Referring now to FIG. 10(*c*), which shows retract valve 170 when it receives a signal from port 170*b*, short and long valve spools 175, 174 will shift in response to pneumatic pressure at the end of the feed cycle. In this position, port 170*c* opens to exhaust port 178*a*. FIG. 10(*d*) shows retract valve 170 when it receives a pneumatic signal from port 170*r* in response to a pneumatic signal from retract pilot valve 150 as shown in FIG. 16, a signal from port 170*r* causes air piston 167 to shift short and long valve spools 175, 174, thereby opening port 170*c* to exhaust port 178A. Referring to FIG. 10(*e*), which shows retract valve 170 when the signal from either port 170*b* or port 170*r* is cut off, air pressure from line S will keep long valve spool 174 and short valve spool 175 apart as shown in FIG. 17, therefore keeping port 170*c* open to exhaust port 178*a*.

Figure 11:
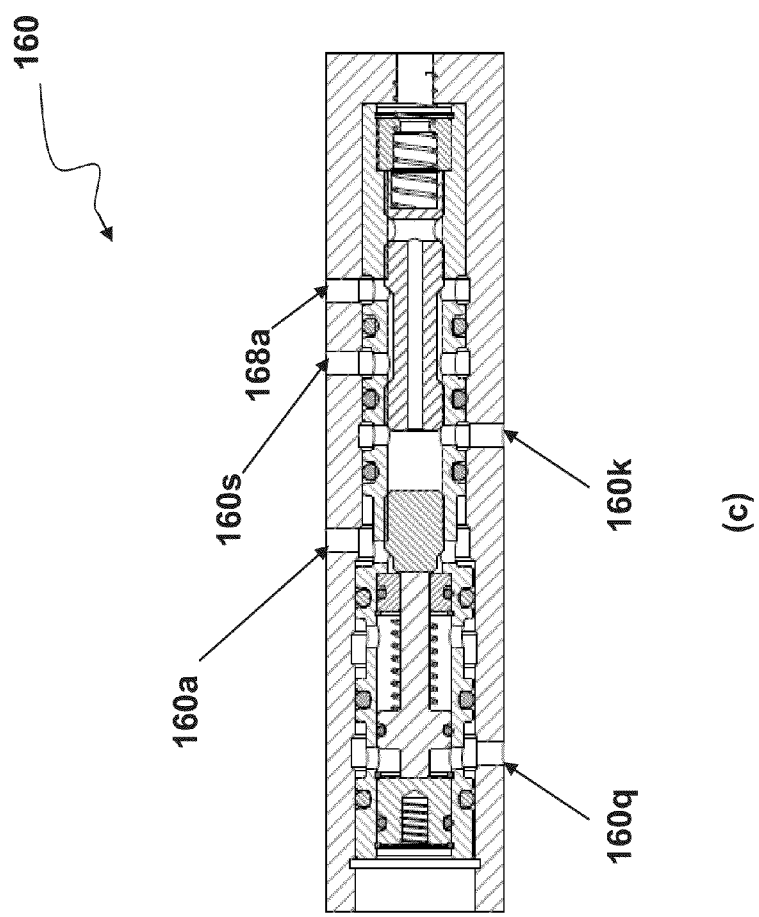
FIG. 11a is an exploded view of the shut off valve.
FIG. 11b is a cross-sectional view of the shut off valve.
FIG. 11c is a cross-sectional view of the shut off valve when the signal from either port 160q or port 160a is cut off.

Referring to FIG. 11(*a*) and Fig(*b*), shut off valve 160 comprises of valve body 161 that houses first spring 162, valve sleeve 163, long valve spool 164, short valve spool 165, bulk head 169, second spring 166, retaining ring 520 and air piston 167.

Bulk head 169 is held between an internal shoulder of valve body 161 and retaining ring 520. Second spring 166 acts between bulk head 169 and air piston 167 to keep the air piston 167 in forward position in the absence of the air pressure. The cavity that houses the second spring 166 is open to atmosphere through exhaust port 168*c* to allow air piston 167 to move forward against the second spring 166 when inlet port 160*q* is pressurized. When port 160*a* receives an air pressure signal from automatic stop pilot valve in the head attachment, the close fit between the internal diameter of the bulk head 169 and the rod of air piston 167 seals port 160*a* from exhaust port 168*c*.

Shut off valve 160 has ports 160*a*, 160*k*, 160*q* and 160*s* that correspond with pneumatic lines A, K, Q, and S, respectively. In addition, shut off valve 160 has exhaust ports 168*a*, 168*b* and 168*c*.

Referring to FIGS. 11 and 12, port 160*a* communicates with pneumatic line A, which connects to 100A on the port panel on the air motor housing 100 which then corresponds to port 200*a* in head attachment 200. Port 160*k* communicates with pneumatic line K, which connects to start pilot valve 130. Port 160*q* communicates with pneumatic line Q, which connects to stop pilot valve 140. Port 160*s* communicates with pneumatic line S, which connects to main air valve 110 and retract valve 170.

Shut off valve 160 is capable of shifting its spools 165 and 164 from either an air pressure signal from port 160*a* that comes from automatic stop pilot valve 330 in head attachment 200 (for automatic stoppage), or from an air pressure signal from port 160*q* that comes from stop pilot valve 140 in the air motor housing assembly 100 (for manual stoppage). FIG. 11*c* shows retract valve 160 when the signal from either port 160*q* or port 160*a* is cut off, air pressure from line K will keep long valve spool 164 and short valve spool 165 apart momentarily as shown in FIG. 17, therefore keeping port 160*s* open to exhaust port 168*a*.

Referring to FIGS. 21, 23 and 32, head attachment 200 comprises of a drive shaft assembly 210, a transfer gear assembly 240, drill spindle assembly 300, and automatic retract pilot valve 320 and automatic stop pilot valve 330. Drive shaft assembly 210, transfer gear assembly 240, and drill spindle assembly 300 are anchored to lower housing unit 400 as shown in FIG. 22, 23.

Head attachment 200 is enclosed in housing 202 having face PP and face PR. As best shown in FIG. 21, face PP and face PR each have ports 200*a*, 200*b*, 200*c*, and 200*d*. Port 200*a* communicates to corresponding port 100*a* on the face of the air motor housing assembly 100, which it leads to shut off valve 160 (see FIGS. 4 and 12). And for ports 200*b*, 200*c*, and 200*d* to communicate to corresponding ports 100*b*, 100*c* and 100*d* respectively on the face of the air motor assembly 100, which they lead to retract valve 170 in air motor housing assembly 100 (see FIGS. 4 and 12).

Figure 22:
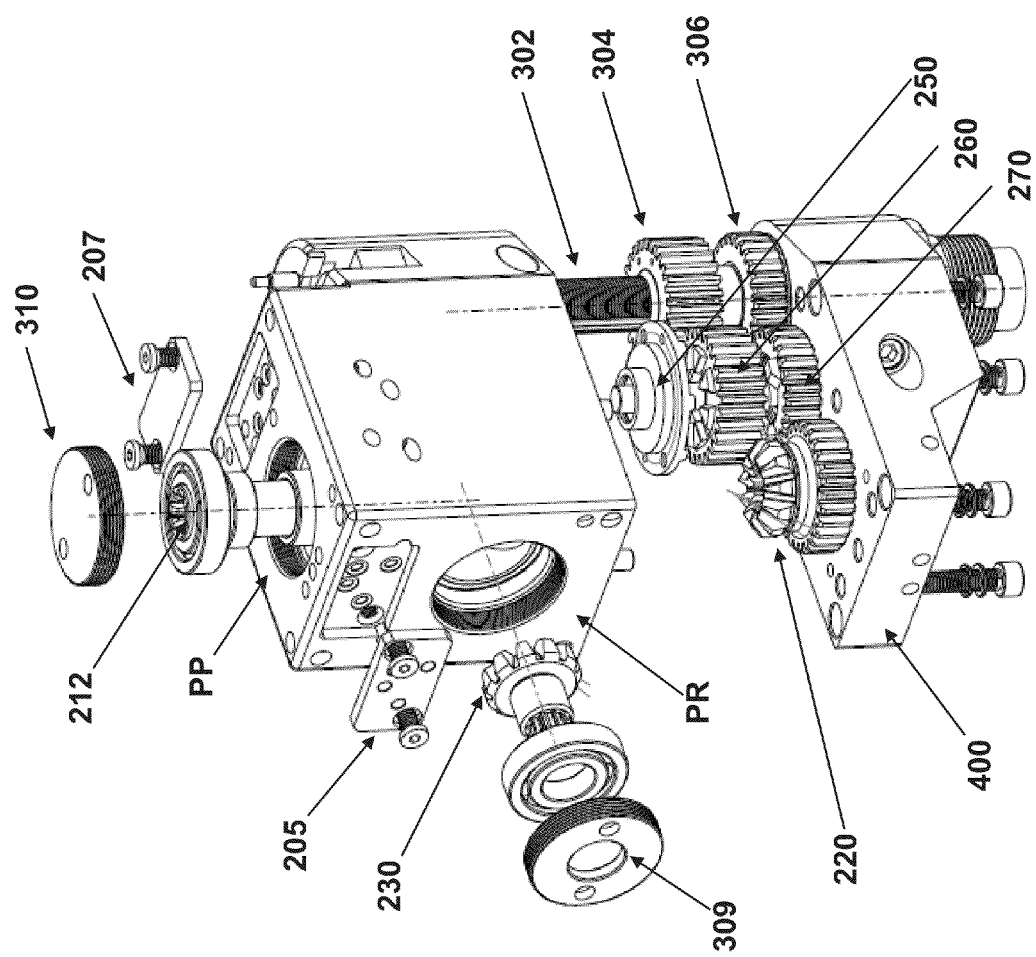
FIG. 22 is an exploded view of the head attachment and the lower housing unit.

Referring to FIGS. 22 and 4, for right angle configuration a pneumatic cover plate 205 with four holes is placed on face PR so that port 200*a* communicates to corresponding port 100*a* on the face of the air motor housing assembly 100, which it leads to shut off valve 160 (see FIGS. 4 and 12). And for 200*b*, 200*c*, and 200*d* to communicate to corresponding ports 100*b*, 100*c* and 100*d* respectively on the face of the air motor assembly 100, which they lead to retract valve 170 in air motor housing assembly 100 (see FIGS. 4 and 12). The second pneumatic cover plate 207 without holes is placed on face PP to seal ports 200a, 200b, 200c and 200d. Spindle cover plate 309 with a center hole is placed on face PR to allow the output spindle 182 (FIG. 2) of the air motor to engage the drive shaft assembly 210 (FIG. 23). Spindle cover plate 310 without a center hole is placed on face PP to prevent foreign material entering the head attachment.

Referring to FIGS. 23 and 2, for in-line angle configuration a pneumatic cover plate 205 with four holes is placed on face PP, so that port 200a communicates to corresponding port 100a on the face of the air motor housing assembly 100, which it leads to shut off valve 160 (see FIGS. 4 and 12). And for ports 200b, 200c, and 200d to communicate to corresponding ports 100b, 100c and 100d respectively on the face of the air motor assembly 100, which they leads to retract valve 170 in air motor housing assembly 100 (see FIGS. 4 and 12). The second pneumatic cover plate 207 without holes is placed on face PR to seal ports 200a, 200b, 200c and 200d. Spindle cover plate 309 with a center hole is placed on face PP to allow the output spindle 182 (see FIG. 2) of the air motor to engage the drive shaft assembly 210. Spindle cover plate 310 without a center hole is placed on face PR to prevent foreign material interning the head attachment.

Figure 24:
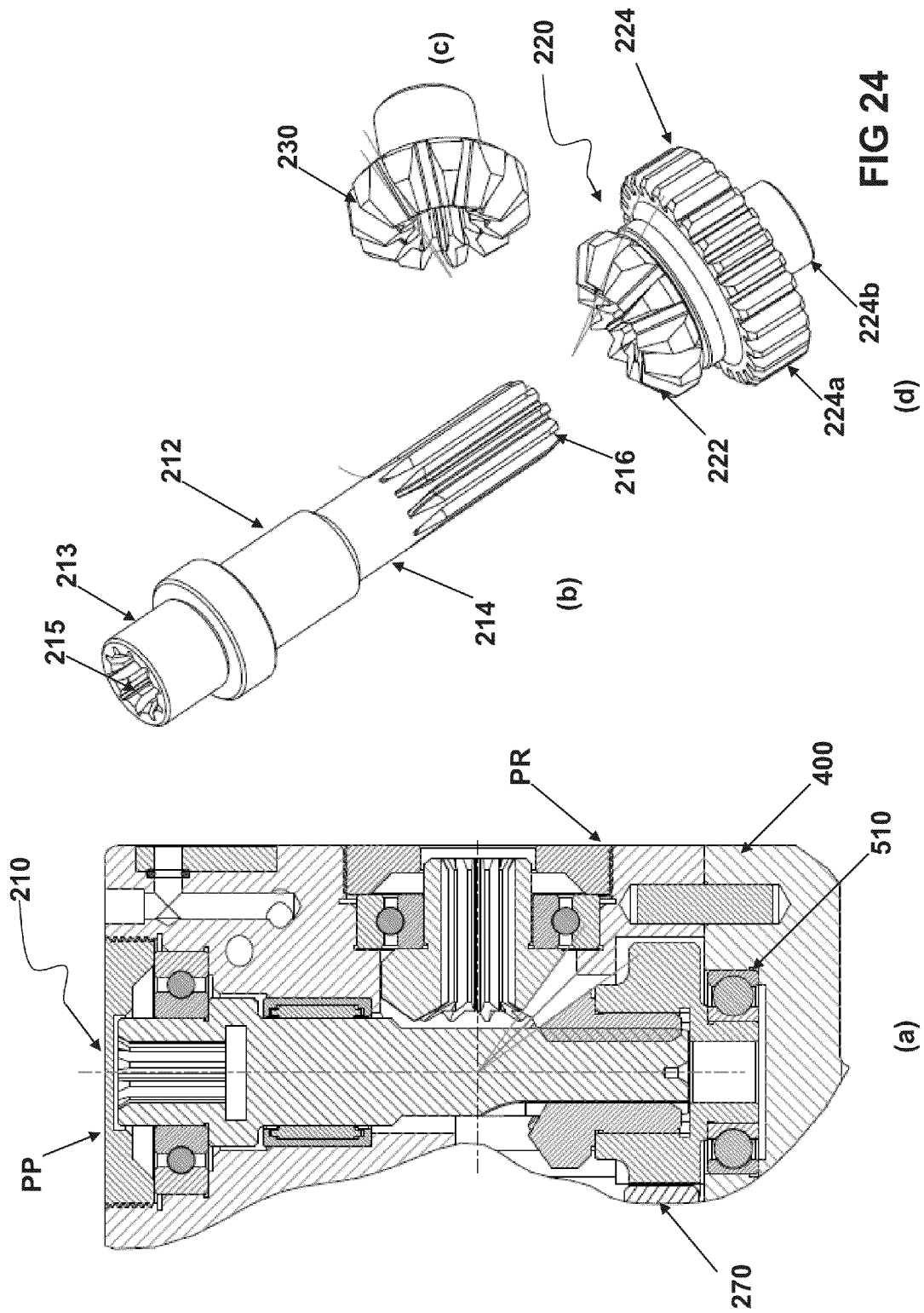
FIG. 24a is a partial cross-sectional view of the head attachment, showing the drive gear assembly.
FIG. 24b is a view of the drive shaft of the drive gear assembly.
FIG. 24c is a view of the drive bevel gear of the drive gear assembly.
FIG. 24d is a view of the bevel-spur gear assembly of the drive gear assembly.

A detailed drawing of drive shaft assembly 210 is shown in FIG. 24(a). Drive shaft assembly 210 comprises a drive shaft 212, a bevel-spur gear assembly 220, and a drive bevel gear 230.

Drive shaft 212 is oriented such that its centerline axis is perpendicular to face PP of housing 202 (FIG. 21). Referring to FIG. 24(b), drive shaft 212 has a first end 213 and a second end 214. First end 213 has internal spline 215 for receiving output spindle 182 of air motor 180 via face PP for operation in the "in-line" mode. Second end 214 has external splines 216 for engaging bevel-spur gear assembly 220. Bevel-spur gear assembly 220 includes a bevel gear 222 and a spur gear 224 as shown in FIG. 24(d). Spur gear 224 has a gear head 224a and a tail 224b. The tail 224b of spur gear 224 is mounted in ball bearing 510 in lower housing unit 400. The tail 224b is positioned to hold the required distance between the centerline of the bevel-spur gear assembly 220 and the transfer gear 270 precisely, as best shown in FIG. 23.

For operation in the "right-angle" mode, drive shaft assembly 210 further comprises drive bevel gear 230 for receiving output spindle 182 of air motor 180 via face PR. Drive bevel gear 230 is mounted with its axis of rotation perpendicular to the axis of rotation of drive shaft 212, such that drive bevel gear 230 engages bevel gear 222 of bevel-spur gear assembly 220.

A detailed drawing of transfer gear assembly 240 is shown in FIG. 25(a). Transfer gear assembly 240 comprises of an air piston 242, a support shaft 244, a clutch plate 250, needle bearing 241, a clutch feed gear 260, ball bearings 524, a transfer gear 270 and ball bearing 526. As shown in FIG. 23, transfer gear assembly 240 is oriented such that support shaft 244 is parallel to drive shaft 212 of drive shaft assembly 210, and transfer gear 270 of transfer gear assembly 240 engages spur gear 224 of the bevel-spur gear assembly 220 and with drive gear 306.

Figure 25:
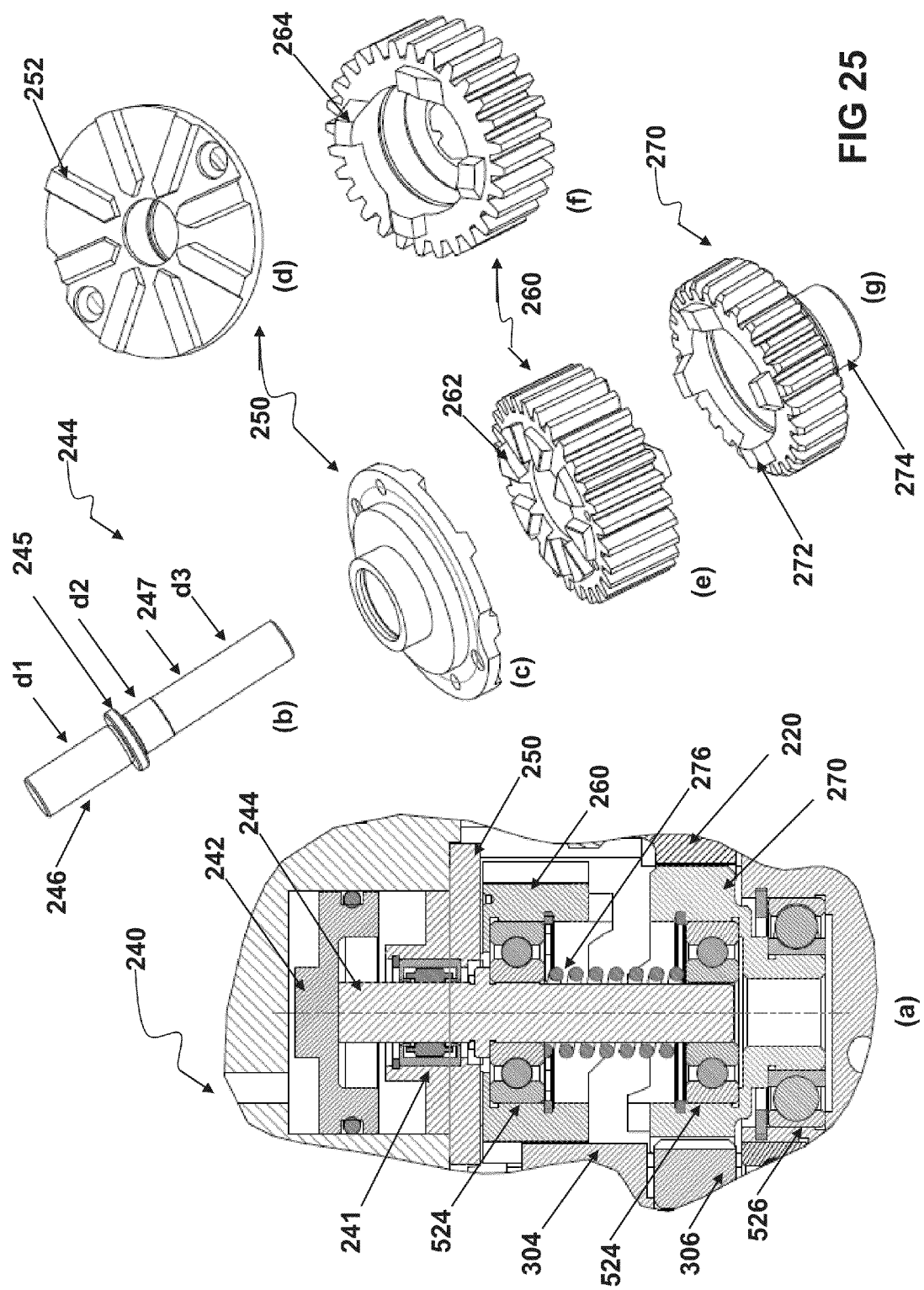
FIG. 25a is a partial cross-sectional view of the head attachment, showing the transfer gear assembly.
FIG. 25b is a view of the supporting shaft of the transfer gear assembly.
FIG. 25c is a view of the clutch plate of the transfer gear assembly.
FIG. 25d is a view of the bottom side of the clutch plate of the transfer gear assembly.
FIG. 25e is a view of the top side of the clutch feed gear of the transfer gear assembly.
FIG. 25f is a view of the bottom side of the clutch feed gear of the transfer gear assembly.
FIG. 25g is a view of the transfer gear of the transfer gear assembly.

Referring to FIG. 25c, Clutch plate 250 is mounted by screws to the upper housing of housing assembly 100 such that it remains stationary. A needle bearing 241 is held between an internal shoulder of the clutch plate 250 and retaining ring. A clutch feed gear 260 is positioned under the clutch plate 250. A ball bearing 524 is held between an internal shoulder of the clutch feed gear 260 and retaining ring. Referring to FIG. 25(d), clutch plate 250 has radial protrusions 252. Referring to FIGS. 25(e) and 25(d), clutch feed gear 260 has radial protrusions 262 on the top side for engaging with radial protrusions 252 of clutch plate 250. Referring to FIGS. 25(f) and 25 (g) Clutch feed gear 260 has driving teeth 264 on the bottom side for engaging with corresponding driving teeth 272 on transfer gear 270. Referring to FIG. 25(g), transfer gear 270 has a tail 274, which enables transfer gear 270 to be mounted in ball bearing 526 in lower housing unit 400. This enables transfer gear 270 to be mounted independently of support shaft 244. The location of the tail 274 of transfer gear 270 is positioned to hold the required distance between the centerlines of the transfer gear 270 and the drive gear 306 precisely. In addition to that, the tail 274 holds the required distance between the centerline of the bevel-spur gear assembly 220 and the transfer gear 270 precisely, as best shown in FIG. 23.

Referring to FIG. 25(b), support shaft 244 has a flange 245 dividing it into a first section 246 that has diameter d1 and a second section 247 that has a diameter d2 and a diameter d3. Diameter d2 holds the distance between the centerlines of the clutch feed gear 260 and the feed gear 304 precisely as best shown in FIG. 23. Diameter d3 is smaller than diameter d2. Referring again to FIG. 25(a), the air piston 242, which is actuated by pneumatic pressure from port 200c, is placed on the top first section 246 of shaft 244 as suppose to fixing the air piston 242 to the support shaft 244 by a screw as it being done in the old art. This arrangement allows the centerlines of the support shaft 244 and air piston 242 not to be perfectly aligned which will improve the function of the drill and reduce the cost of manufacturing, as explained in more details below.

Again referring to FIG. 25, a spring 276 is located around diameter d3 of support shaft 244 between ball bearing 524 in clutch feed gear 260 and the ball bearing 524 in transfer gear 270, to separate clutch feed gear 260 and transfer gear 270 when there is an absence of air pressure behind the air piston 242.

When the clutch feed gear 260 is held in the upper position by force of spring 276 as shown in FIGS. 25(a) and 23, clutch feed gear 260 engages clutch plate 250 such that clutch feed gear 260 is held fixed and prevented from rotation and in turn feed gear 304 is also held from rotation. When air piston 242 is compressed by air pressure from port 200c, it pushes support shaft 244 down, causing the flange 245 of the support shaft 244 to push the ball bearing 524 in the clutch feed gear 260, thus disengaging the clutch feed gear 260 from the clutch plate 250 and engaging with the transfer gear 270.

Diameter d3 of section 247 of support shaft 244 is much smaller than the internal diameter of ball bearing 524 in transfer gear 270. The importance of this feature is that the support shaft 244 will now go through the internal diameter of ball bearing 524 that is located in the transfer gear 270; even if the centerlines of the clutch feed gear 260 and transfer gear 270 are not perfectly aligned and still will engage. Once the support shaft 244 is placed in the ball bearing 524 it will allow the engagement between the clutch feed gear 260 and transfer gear 270. The existence of diameter d3 of the support shaft 244 is not important to engaging and disengaging the clutch feed gear 260 and transfer gear 270 and it is not also important to locate the transfer gear 270, but needs to remain in the current location in order to position the spring 276 between the two ball bearings 524.

The clearance between d3 of section 247 of support shaft 244 and the internal diameter of the ball bearing 524 in transfer gear 270 will also prevent binding between the two diameters. The innovative design of the transfer gear assembly 240 will allow spring 276 to push up the clutch feed gear 260 and disengage from the transfer gear 270 under any conditions.

The illustration of how the new invention helped solve the problem, among many, of disengaging the clutch feed gear 260 from the transfer gear 270, due to misalignment, is explained in detail below.

Figure 26:
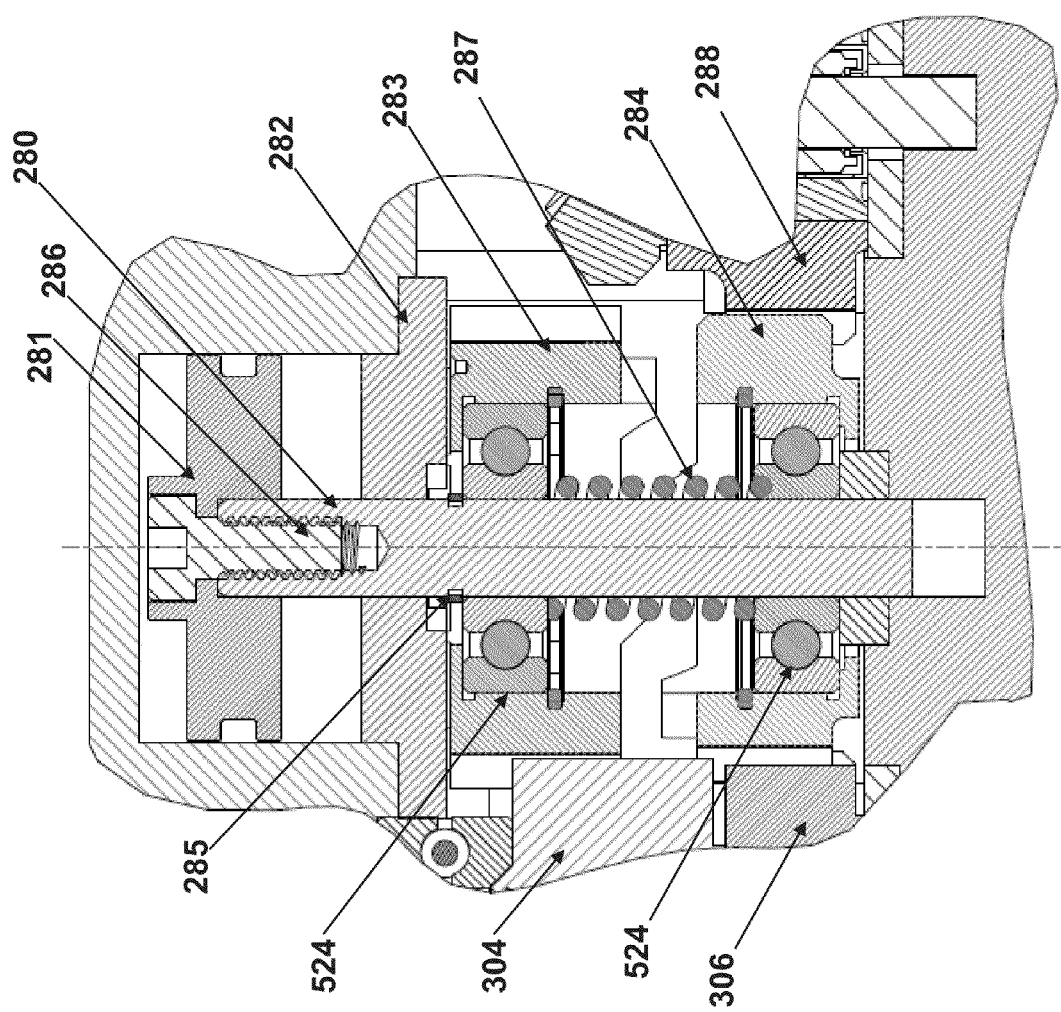
FIG. 26 is a cross-sectional view of the transfer gear assembly in the old art.

FIG. 26 shows a detail drawing of the transfer gear assembly of the old art, which comprises of an air piston 281, screw 286, support shaft 280, retaining ring 285, clutch plate 282, clutch feed gear 283, spring 287 and transfer gear 284.

The air piston 281 is secured to the support shaft 280 by a screw. A retaining ring 285 is placed on the support shaft 280; such that it is positioned against the ball bearing 524 in the clutch feed gear 283. When the air piston 281 is pressurized and pushing down the support shaft 280, in turn the retaining ring 285 will push the clutch feed gear 283 down to engage with the transfer gear 284. In the absence of air pressure the force of the spring will push the clutch feed gear 283 against the retaining ring 285, which will cause the support shaft 280 to move up with the clutch feed gear 283. Consequently, the support shaft 280 will push the air piston 281 up to its original position. In the old design, the repeated load against the retainer ring 285 will dislodge the retainer ring 285 from its groove on the support shaft 280. This will cause the tool to fail. In the new design, the flange 245 that is an integral part of the support shaft 244 will solve this issue as shown in FIG. 25 (a)-(b).

The support shaft 280 of the old design is positioned by the clutch plate 282. The support shaft 280, in turn, positions the centerlines of the air piston 281 and clutch feed gear 283. The position of the support shaft 280 will also affect the required distance between the clutch feed gear 283 and the feed gear 304 centerlines. In addition, the support shaft 280 will also affect the required distance between the transfer gear 284 and drive gear 306 centerlines, as well as the required distances of transfer gear 284 and bevel spur gear assembly 288 centerlines. Manufacturing and assembly the head attachment that require the support shaft 280 to hold the centerline distances between gears and to be b aligned to the transfer gear 284 is very costly and not practical. Even with small misalignment, the adverse effect that the support shaft 280 has on these required distances will cause the gears to operate inefficiently and severe wear and tear may be seen over a very short period of time.

Also the binding due to misalignment between the support shaft 280 and the ball bearing 524 located in the transfer gear 284 will inhibit the spring to disengage the clutch feed gear 283 from the transfer gear 284 as shown in FIG. 26. When a large torque is required to drill a large hole and/or to drill a deep hole in a work piece, a huge side load will be generated between drive gear 306 and transfer gear 284, also between the clutch feed gear 283 and the feed gear 304. This side loading between the gears will exasperate the misalignment (in the old art) and that, will make the support shaft 280 bind even more between the clutch feed gear 283 and the transfer gear 284. Trying to use a stronger spring to overcome the disengagement problem, in the old art, will not be feasible, since the force of the spring 287 must be less than the force created by the air pressure behind the air piston 281, which it does limit the size of the spring. As it had been experienced, sometime the force that is needed to overcome the binding force between the support shaft 280 and transfer gear 284 is beyond any sizable spring force that can be used in this type of drill. As can be seen, the new invention has solved all the issues in the old art that existed in the transfer gear assembly.

Referring to FIG. 23, the engagement of clutch feed gear 260 and transfer gear 270 enables transfer gear 270 to drive clutch feed gear 260, which in turn operates, to advance cutter spindle 302. The force of the spring 276 in the absence of the air pressure behind the air piston 242 will disengage the clutch feed gear 260 from the transfer gear 270 and to engage the clutch plate 250. The engagement of the clutch feed gear 250 with clutch plate will hold the clutch feed gear 250 from rotation and this cause the cutter spindle 302 to retract, as described more fully below.

Figure 27:
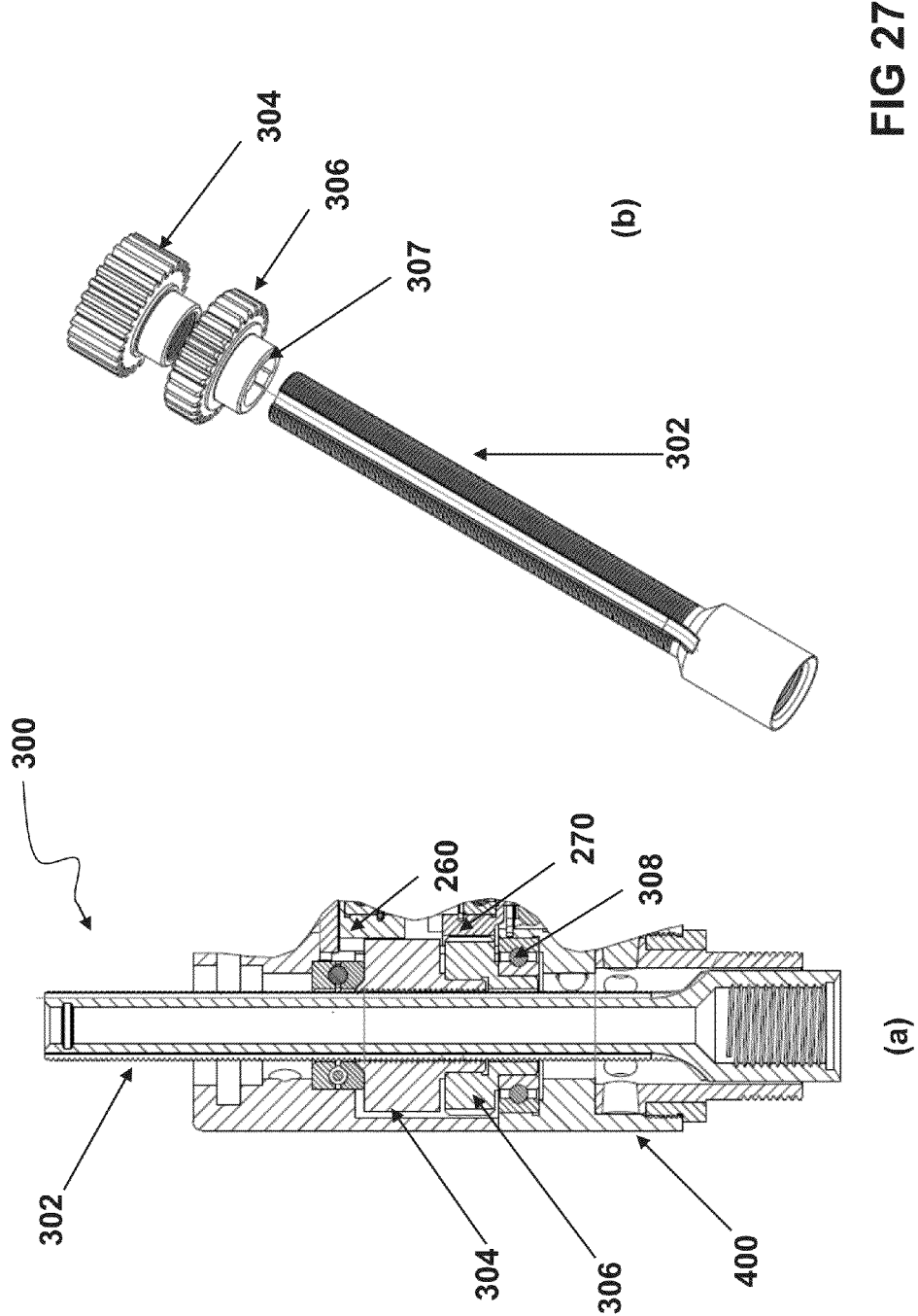
FIG. 27a is a cross-sectional view of the drill spindle assembly.
FIG. 27b is an exploded view of the drill spindle assembly.

Referring to FIG. 27, drill spindle assembly 300 comprises a cutter spindle 302, feed gear 304, and drive gear 306. In a preferred embodiment of the invention, cutter spindle 302 also includes a first adjustable nut and a second adjustable nut.

As shown in FIG. 23 and FIG. 27, drill spindle assembly 300 is mounted in engagement with transfer gear assembly 240. Drill spindle assembly 300 is oriented such that the centerline of cutter spindle 302 is parallel to the centerline of the support shaft 244 of transfer gear assembly 240. Feed gear 304 sits on the top of the drive gear 306 and is engaged with clutch feed gear 260 at all times. The feed gear 304 is threaded to the spindle 302. Drive gear 306 has a tail 307 that is positioned in the ball bearing 308 in the lower housing unit 400. The location of the tail 307 of the drive gear 306 is positioned to hold the required distance between the centerline of the drive gear 306 and the transfer gear 270. The internal key of the drive gear 306 is engaged with the cutter spindle slot, allowing the cutter spindle 302 to rotate whenever the drive gear 306 rotates. The keyed relationship between the drive gear 306 and the cutter spindle 302 will allow the cutter spindle 302 to either retract or feed. Whether the cutter spindle 302 retracts or feeds is dependent on the position of the clutch feed gear 260. When the clutch feed gear 260 is disengaged from the clutch plate 250 and engages with the transfer gear 260, which will then rotate the feed gear 304. Whenever the feed gear 304 is in rotation, the cutter spindle 302 will feed. In contrast, when the clutch feed gear 260 is engaged to the clutch plate 250 and disengaged from the transfer gear 270, it will be held from rotation, also holding the feed gear 304 from rotation. When the feed gear 304 is held from rotation, the cutter spindle 302 will retract.

Figure 28:
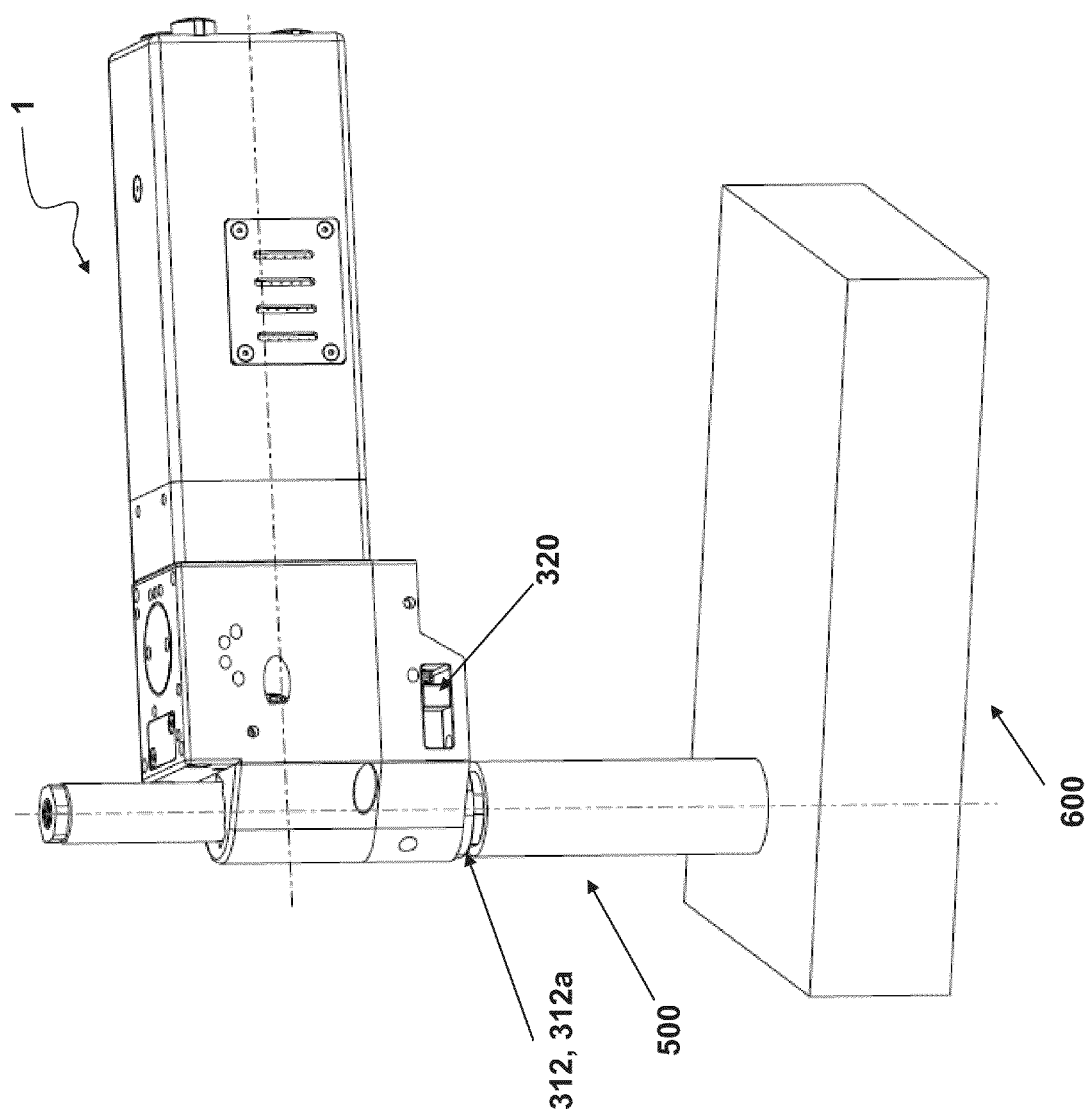
FIG. 28 is an isometric view of the drill when is held by nosepiece to perform drilling in a work piece.

Referring to FIG. 28, In order to position the drill in location where the drilling will take place, the nosepiece 500 is attached to the work piece and to nosepiece attachment of the drill. The drill is equipped with non-swivel nosepiece adapter 312a or swivel nosepiece adapter 312. A customer may want to utilize the swivel nosepiece adapter 312 for orienting the tool in limited access areas where obstruction needs to be avoided. In the old art, the design of the swivel nosepiece attachment allows for a play (small radial movement) while holding the tool in position to drill, that will affect the quality of the hole that is being drilled. The new invention of the swivel nosepiece attachment holds the tool rigidly in position and eliminates the unwanted play (a small radial movement) of the drill while is drilling. The swivel nose piece attachment has eight positions that will allow the tool to be indexed from one position to another by pushing back on the retract pilot valve 320, as explained more fully below.

If orientation is not a requirement, and low cost is a preference, the non-swivel nosepiece adapter 312a (see FIG. 30) may be utilized. The changeover from non-swivel nosepiece adapter to swivel nosepiece adapter in the existing product require the change of the entire lower housing unit. In the new invention the changeover is very easy and simple and does not require the change of the lower housing unit 400.

Figure 30:
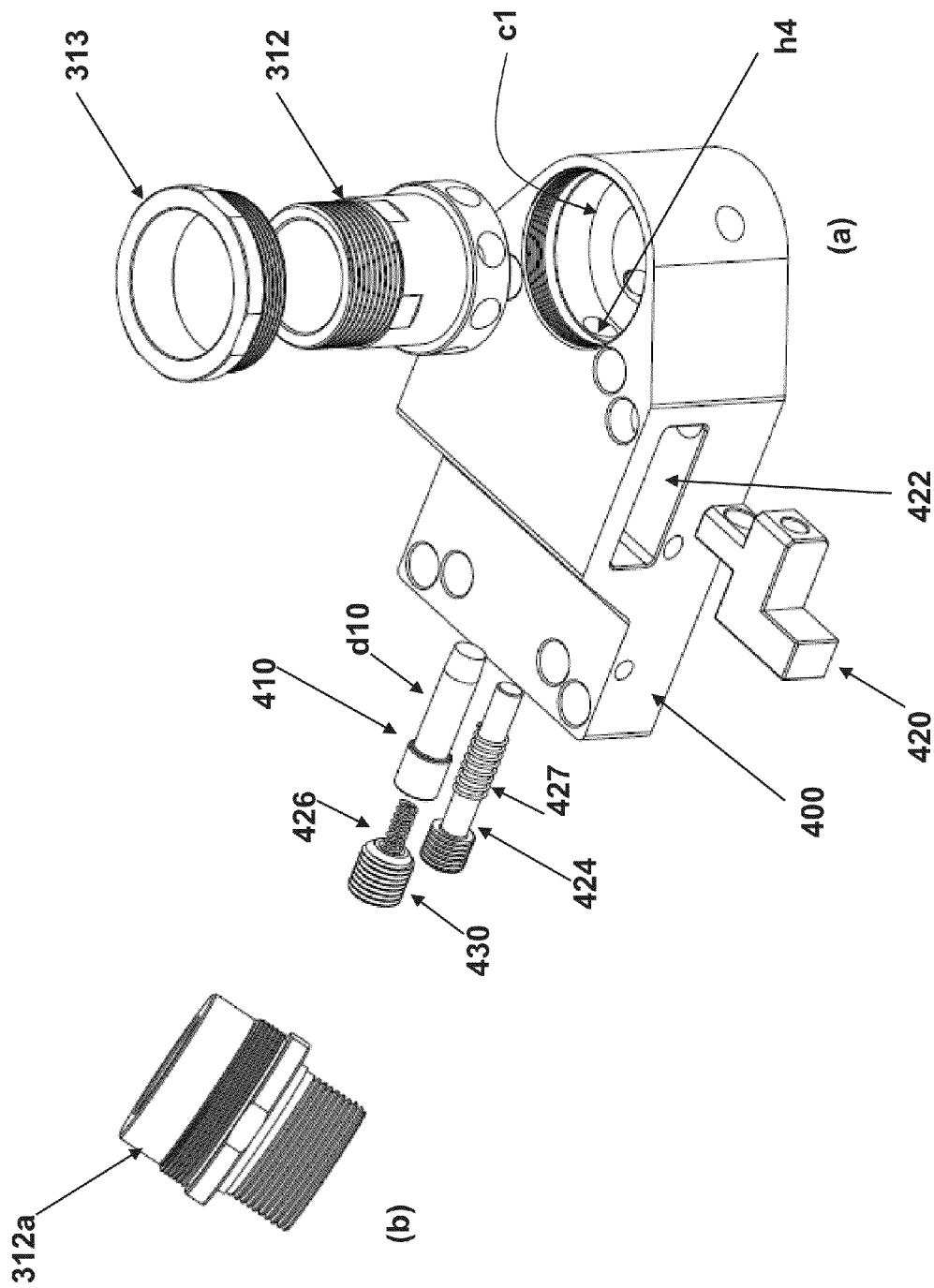
FIG. 30a is an exploded view of the lower housing unit.
FIG. 30b is an isometric view of the non-swivel nosepiece adapter.

Referring to FIG. 30, the swivel nosepiece attachment assembly comprises of swivel nosepiece adapter 312, a lock nut 313, a release knob 420, a tapered lock pin 410, a support shaft 424, a spring 426, set screw 430 and a spring 427.

Figure 29:
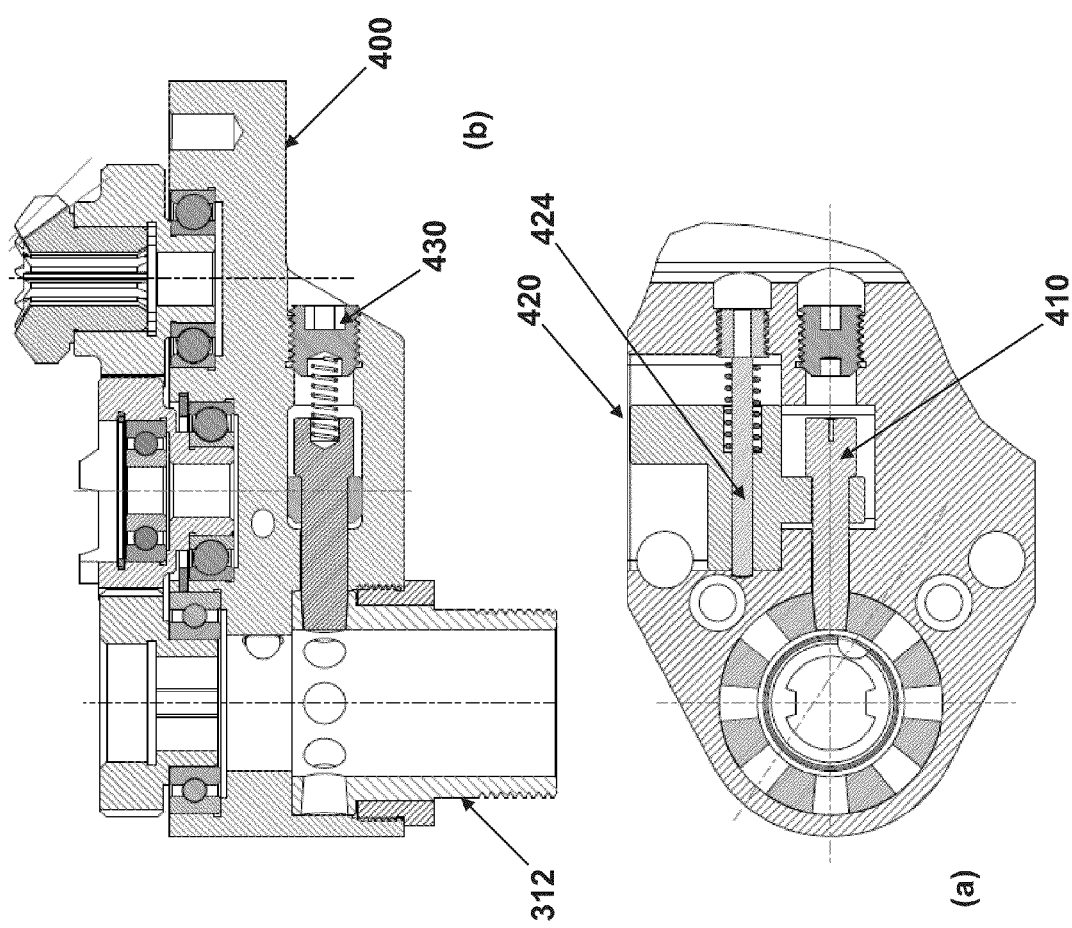
FIG. 29a is a bottom cross-sectional view of the lower housing unit.
FIG. 29b is a side cross-sectional view of the lower housing unit.
Figure 31:
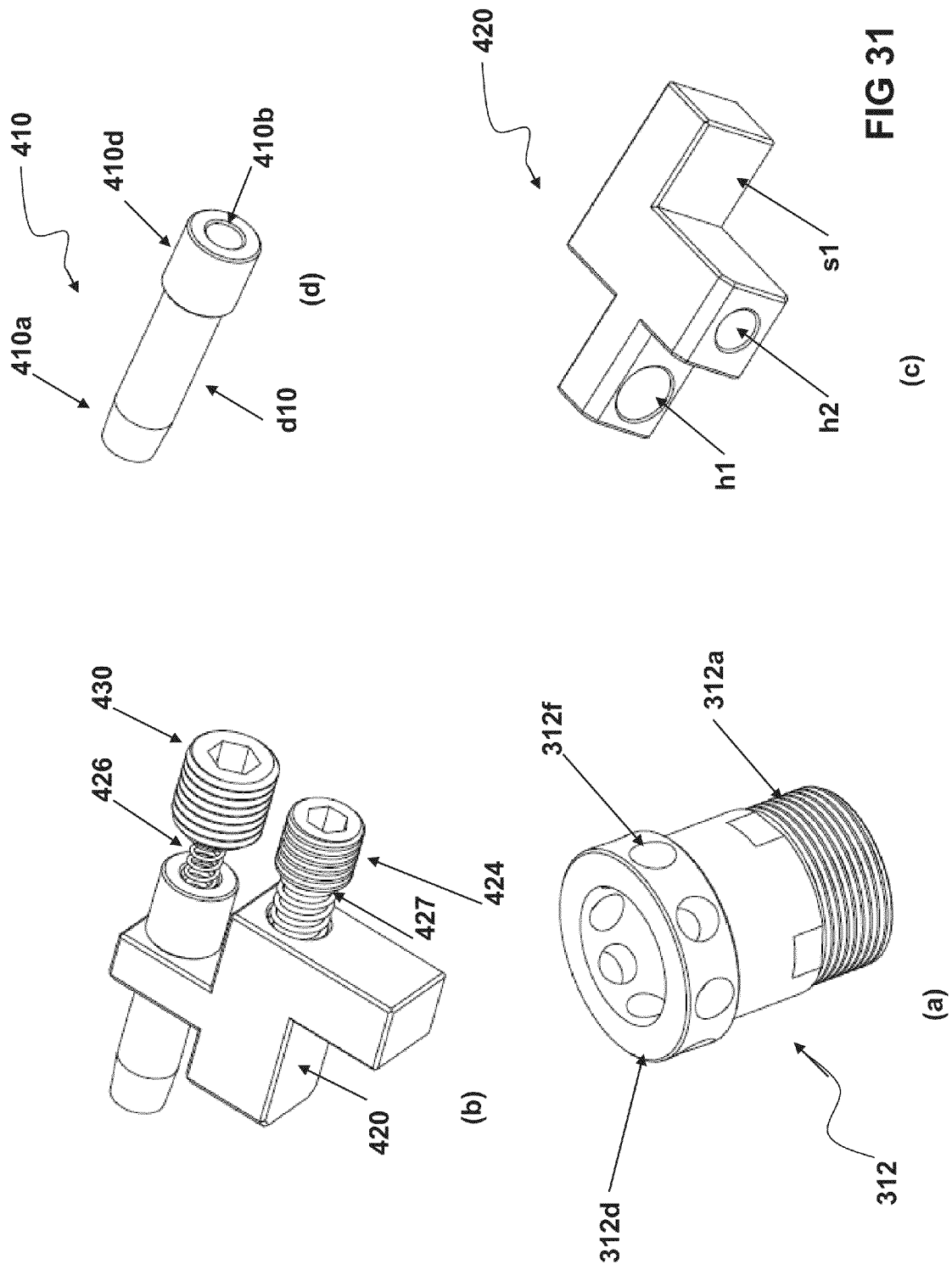
FIG. 31a is isometric view of the swivel nosepiece adapter.
FIG. 31b is isometric view of the release knob assembly.
FIG. 31c is isometric view of the release knob.
FIG. 31d is isometric view of the tapered lock pin.

Referring to FIGS. 31 (a) and (d), the flange 312d of the nosepiece adapter 312 has eight tapered holes 312f arranged radially to receive the tapered lock pin 410. Referring to FIGS. 29 and 30, the swivel nosepiece adapter 312 is held between the internal shoulder of the counter bore C1 of the lower housing unit 400 and the lock nut 313 such that the swivel nosepiece adapter 312 is allowed to rotate axially with a very minimum clearance. The support shaft 424 is threaded into the lower housing unit 400. The release knob 420 is positioned in the slot 422 of the lower housing unit 400, such that the h2 hole in the release knob 420 aligns with support shaft 424. The support shaft 424 holds the release knob and allows it to slide back and forth. The spring 427 is acting between the release knob 420 and the head diameter of the support shaft 424 as best shown in FIG. 29.

As shown in FIGS. 31 (b) and (d), the head diameter 410d of the tapered lock pin 410 has counter bore 410b that receives the spring 426. The spring 426 sits between the bottom of the counter bore 410b of the tapered lock pin 410 and the set screw 430 as best shown in 31(b).

Referring to FIGS. 31 (c) and (d), the straight diameter d10 of the tapered lock pin 410 fits very closely through the hole h1 of the release knob 420 and the hole h4 in the lower housing unit 400 as best shown if FIGS. 29 and 30. The hole h4 in the lower housing unit 400 (see FIGS. 30 and 29) aligns axially with the tapered holes 312f of the swivel nosepiece adapter. Springs 426 push the tapered lock pin 410 to engage the tapered diameter 410a of the tapered lock pin 410 with the radial hole 312f in the swivel nosepiece adapter 312. The tapered engagement between the tapered lock pin 410 and the tapered hole 312f will prevent the swivel nosepiece adapter from any rotational movement when it is locked in place under the force the spring 426. Spring 427 push the release knob 420 forward. The two springs are nearly equal in force so that the movement of the release knob 420 is smooth and will not create an imbalance moment.

Referring to FIGS. 31 (a) and (d) and 29, due to the force of springs, the tapered diameter 410a of the tapered lock pin 410 is engaged into one of the tapered holes 312f of the swivel nosepiece adapter 312, this type of engagement between the tapered lock pin 410 and the swivel nosepiece adapter 312 will prevent the swivel nosepiece adapter 312 from any play (a small radial movement).

Tapered lock pin 410 can be released from tapered hole 312f in swivel nosepiece adapter 312 by pushing against shoulder s1, see FIG. 31 (c), of nosepiece adapter release knob 420 to index the drill 1 from one position to another. This also allows quick change over from a swivel nosepiece adapter 312 to a non-swivel nosepiece adapter 312a (in FIG. 30).

Head attachment 200 includes automatic stop pilot valve 330 and automatic retract pilot valve 320 as shown in FIGS. 32-36.

Figure 20:
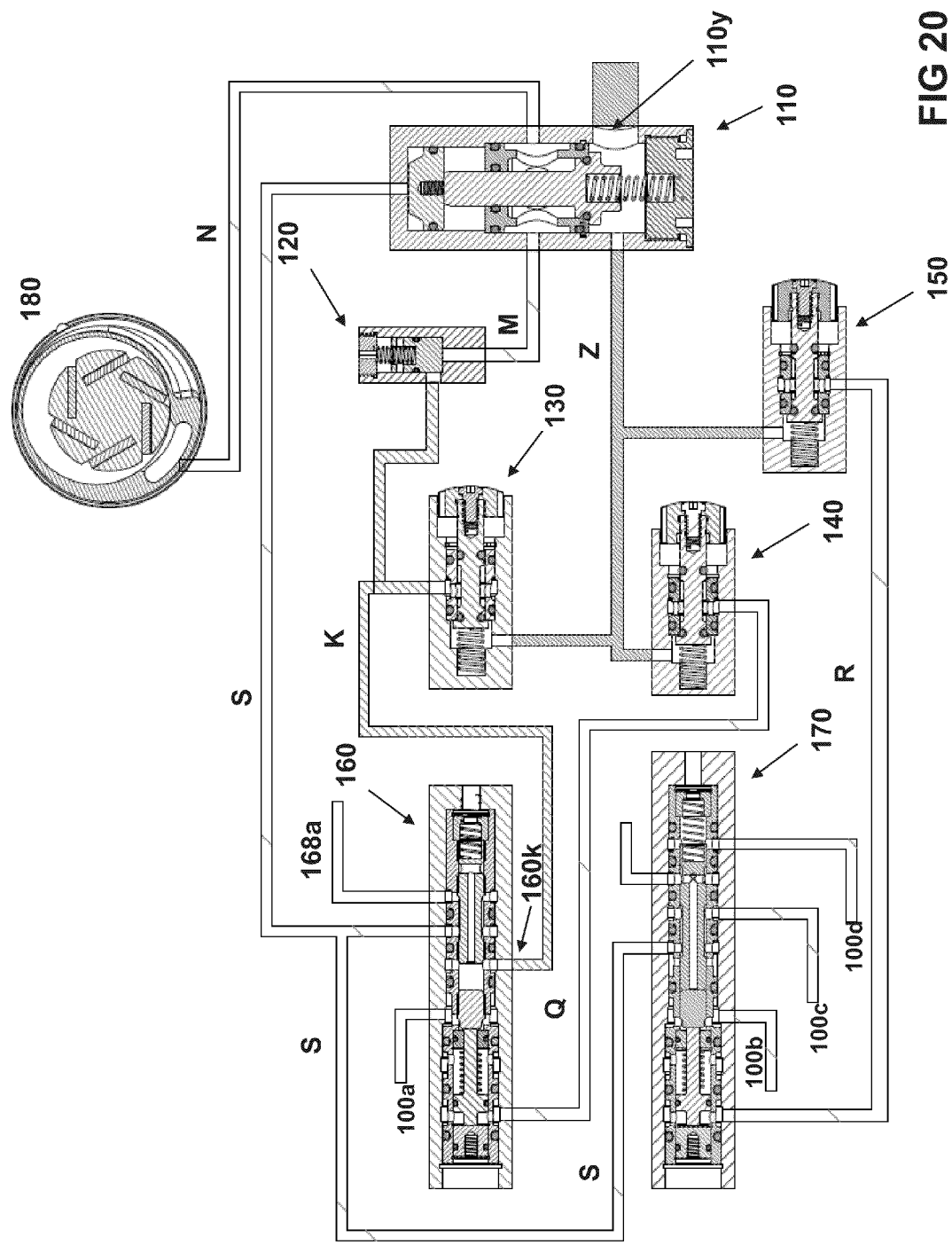
FIG. 20 is a schematic of the pneumatic logic control of the air motor housing assembly at the end of the operation cycle.

Automatic retract pilot valve 320 includes a movable stem 322 that regulates inlet port 324c and outlet port 326b. In a preferred embodiment of the invention, automatic retract pilot valve 320 is located in relation to drill spindle assembly 300, such that the head of stem 322 engages the first adjustable nut of cutter spindle 302. Referring to FIGS. 32, 21 and 20, port 200b on face PP is connected to port 200b on face PR, and both ports are connected to the outlet port 326b of automatic retract pilot valve 320 in head attachment 200. In this way, automatic retract pilot valve 320 in head attachment 200 communicates with retract valve 170 in air motor housing assembly 100 via port 200b.

Similarly, still referring to FIGS. 32, 21, 20 and 25, port 200c on face PP is connected to port 200c on face PR, and both ports are connected to inlet port 324c of automatic retract pilot valve 320 in head attachment 200, bisected by connection to air piston 242 of transfer gear assembly 240. In this way, automatic retract pilot valve 320 in head attachment 200 communicates with retract valve 170 in air motor housing assembly 100 via port 200c.

Automatic stop pilot valve 330 includes a movable stem 332 that regulates inlet port 334d and outlet port 336a. Automatic stop pilot valve 330 is located in relation to drill spindle assembly 300, such that the head of stem 322 engages the second adjustable nut of cutter spindle 302. Referring to FIGS. 32, 21, and 20, port 200a on face PP is connected to port 200a on face PR and both ports are connected to the outlet port 336a of automatic stop pilot valve 330 in head attachment 200. In this way, automatic stop pilot valve 330 in head attachment 200 communicates with shut off valve 160 in air motor housing assembly 100 via port 200a.

Similarly, still referring to FIGS. 32, 21, and 20, port 200d on face PP is connected to port 200d on face PR, and both ports are connected to inlet port 334d of automatic stop pilot valve 330 in head attachment 200. In this way, automatic stop pilot valve 330 in head attachment 200 communicates with retract valve 170 in air motor housing assembly 100 via port 200d.

FIG. 12 shows the pneumatic logic control system of the air motor housing assembly 100 in stand-by mode. Air pressure from an air pressure source (not shown) enters main air valve 110 at port 110y. In the stand-by mode, ports 100m, and 110n of main air valve 110 are closed. Port 110z is open in the stand-by mode, allowing pneumatic pressure in line Z to pressurize start pilot valve 130, stop pilot valve 140, and retract pilot valve 150.

In order to feed cutter spindle 302, two steps must occur. First, air motor 180 must be powered to drive the gear assemblies in head attachment 200. Second, pneumatic pressure must be supplied to transfer gear assembly 240 (see FIG. 25) in head attachment 200 so that clutch feed gear 260 engages transfer gear 270, thereby enabling the feeding operation of cutter spindle 302.

Figure 13:
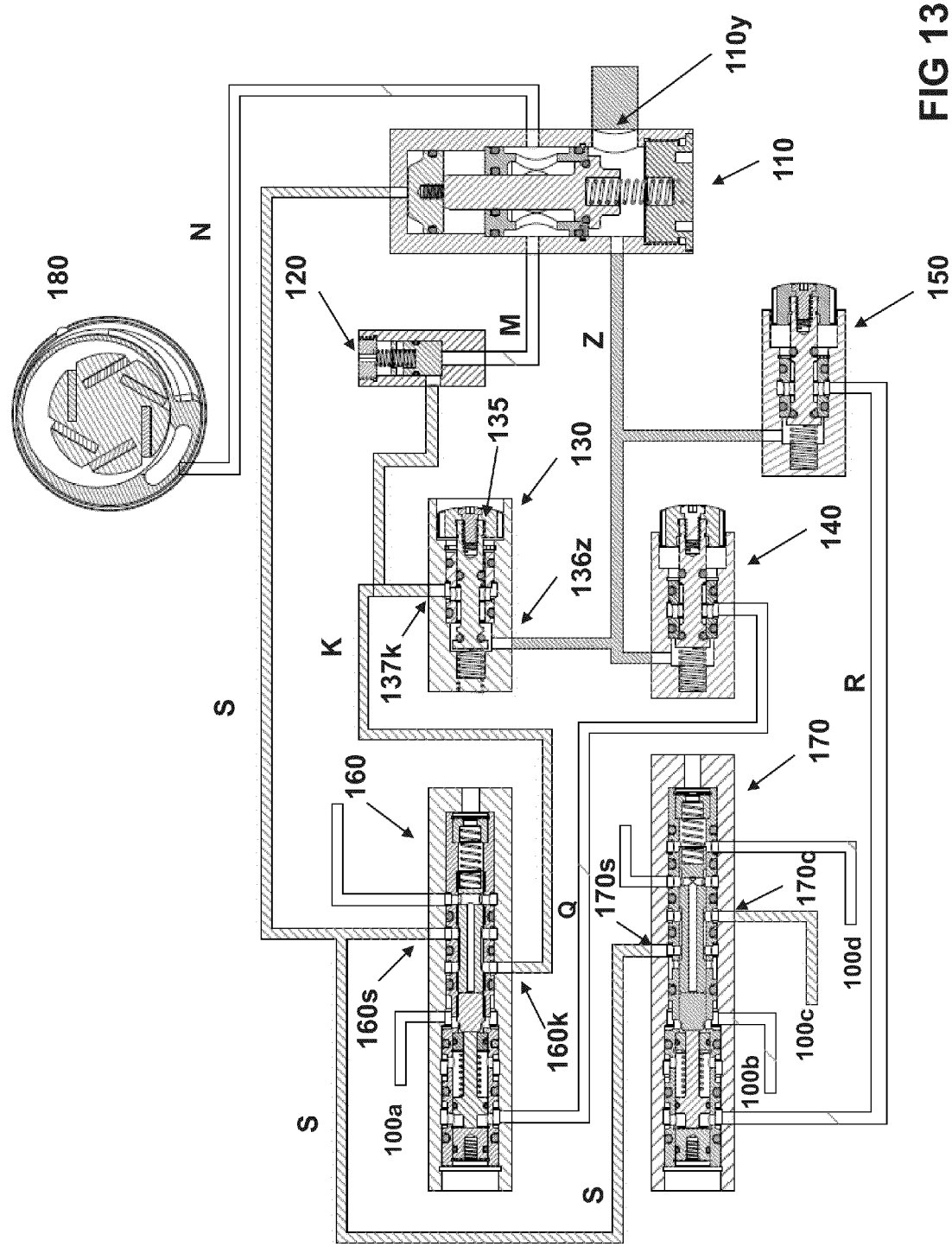
FIG. 13 is a schematic of the pneumatic logic control of the air motor housing assembly when the start pilot valve is depressed.
Figure 14:
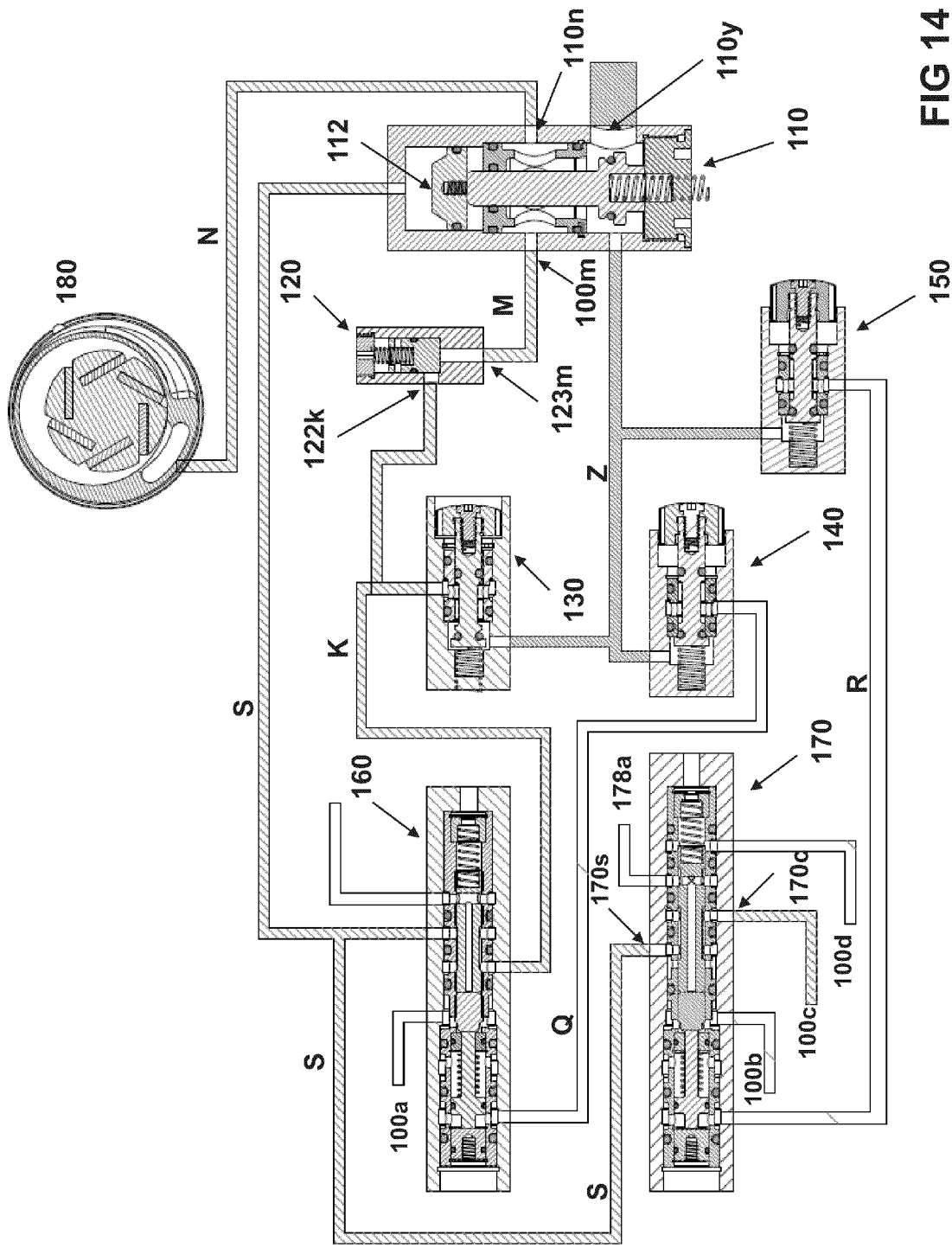
FIG. 14 is a schematic of the pneumatic logic control of the air motor housing assembly when the start pilot valve is depressed and the main air valve is activated.

FIG. 13 shows the system when start pilot valve 130 is actuated in order to power air motor 180 for driving head attachment 200. When start pilot button 135 is depressed as shown in FIG. 13, port 137K (see FIG. 13) is opened to allow inlet pressure from line Z to pressurize line K. Line K connects start pilot valve 130 to shut off valve 160 and delay valve 120. Pressure from line K is directed through shut off valve 160 to port 160s (see FIG. 11) to pressurize line S. Pneumatic pressure from line S causes air piston 112 (see FIG. 9) of main air valve 110 to be compressed as shown in FIG. 14.

The delay valve 120 operates to block air pressure in line K from exhausting to the air motor through main air valve 110, thus maximizing pressure in line S for the compression of air piston 112 in main air valve 110 as explained in the section.

Figure 15:
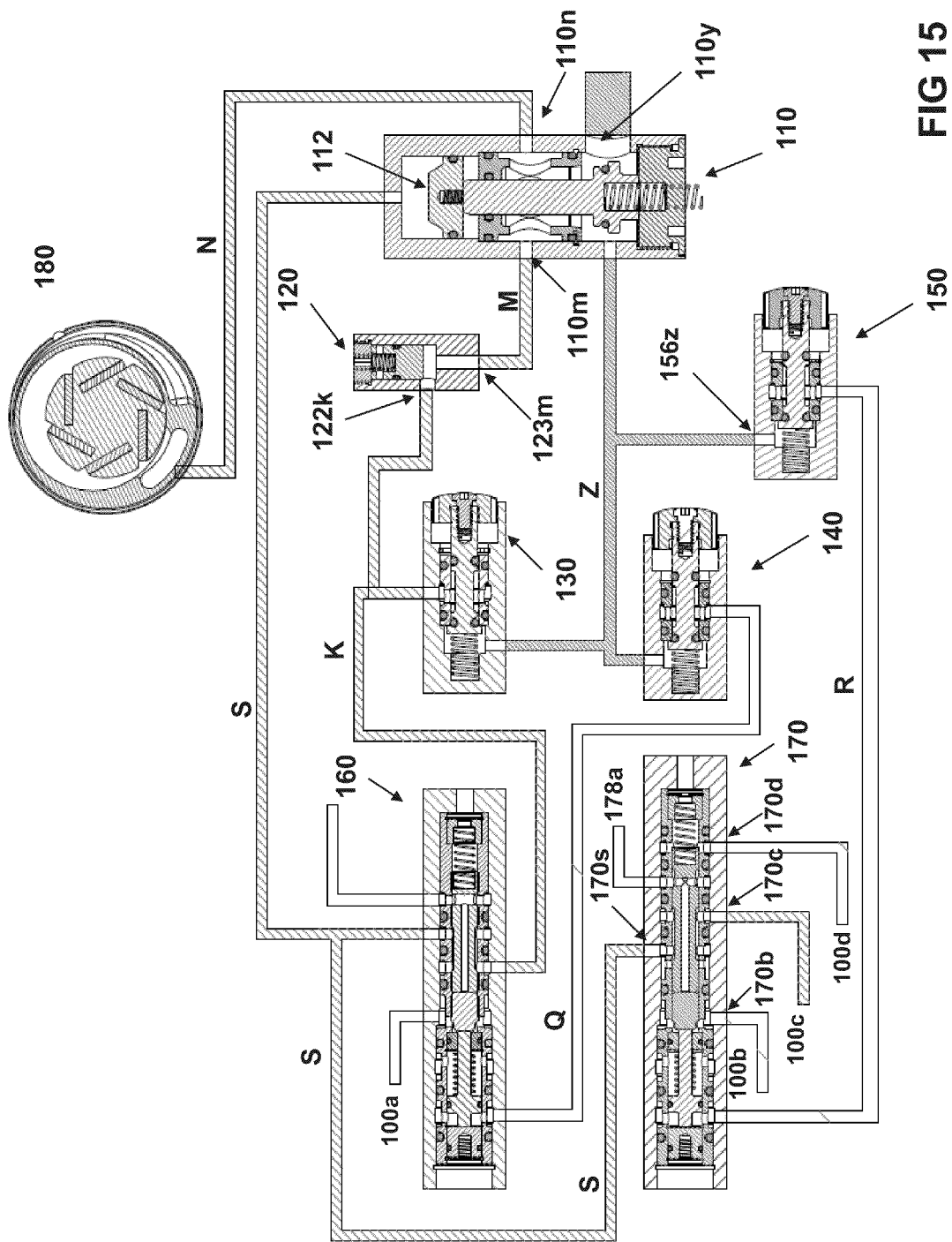
FIG. 15 is a schematic of the pneumatic logic control of the air motor housing assembly when the delay valve is activated after the start pilot valve is depressed and then released.

Compression of air piston 112 in main air valve 110 opens ports 110m and 110n, thereby pressurizing lines M and N. The pressurization of line N operates to power air motor 180. Referring now to FIG. 15, which shows delay valve 120 in activated mode, the pressurization of line M pushes spool (see FIG. 8) 121 of delay valve 120 up, thereby continue supplying the air pressure in lines K and S during the entire cycle after the start pilot valve 130 has been released.

The operation of air motor 180 powers output spindle 182 (see FIG. 2), which in turn drives head attachment 200 in either the "right-angle" mode or "in-line" mode. Specifically, referring to FIGS. 23, 24 and 25, in the "in-line" mode, the output spindle 182 is received in splined end 213 of drive shaft 212. Rotation of drive shaft 212 causes rotation of spur gear 224 of bevel-spur gear assembly 220, which drives transfer gear 270. Transfer gear 270 drives drive gear 306 to spin cutter spindle 302. In the "right-angle" mode, cutter spindle 302 is received in drive bevel gear 230. Rotation of drive bevel gear 230 likewise causes rotation of transfer gear 270 to power drive gear 306 for driving cutter spindle 302.

In order for rotation of transfer gear 270 to effectuate feeding of cutter spindle 302, transfer gear 270 must engage clutch feed gear 260. To move clutch feed gear 260 downwards to engage transfer gear 270, air piston 242 (see FIG. 25) in head attachment 200 must be compressed by a pneumatic pressure through port 200c. Port 200c of head attachment 200 connects to port 100c on the air motor housing assembly 100 that leads to retract valve 170 in air motor housing assembly 100. Accordingly, it is necessary to pressurize line S that leads to retract valve 170 in order to pressurize port 170c of retract valve 170. In turn, the pressurization of port 100c in the air motor assembly 100 which pressurize port 200c in the air motor attachment 200, causes air piston 242 to compress, such that clutch feed gear 260 and transfer gear 270 become engaged.

When clutch feed gear 260 and transfer gear 270 are engaged, transfer gear 270 drives clutch feed gear 260, which in turn drives feed gear 304 on spindle assembly 300. Feed gear 304 operates to feed cutter spindle 302 through their threaded engagement. Thus, when drive shaft assembly 210 operates to drive transfer gear assembly 240, and clutch feed gear 260 is engaged with transfer gear 270, spindle assembly 300 operates to feed cutter spindle 302 for drilling operation.

The cutter spindle 302 can be manually retracted or automatically retracted. Cutter spindle 302 is automatically retracted at the end of the feed operation.

Figure 34:
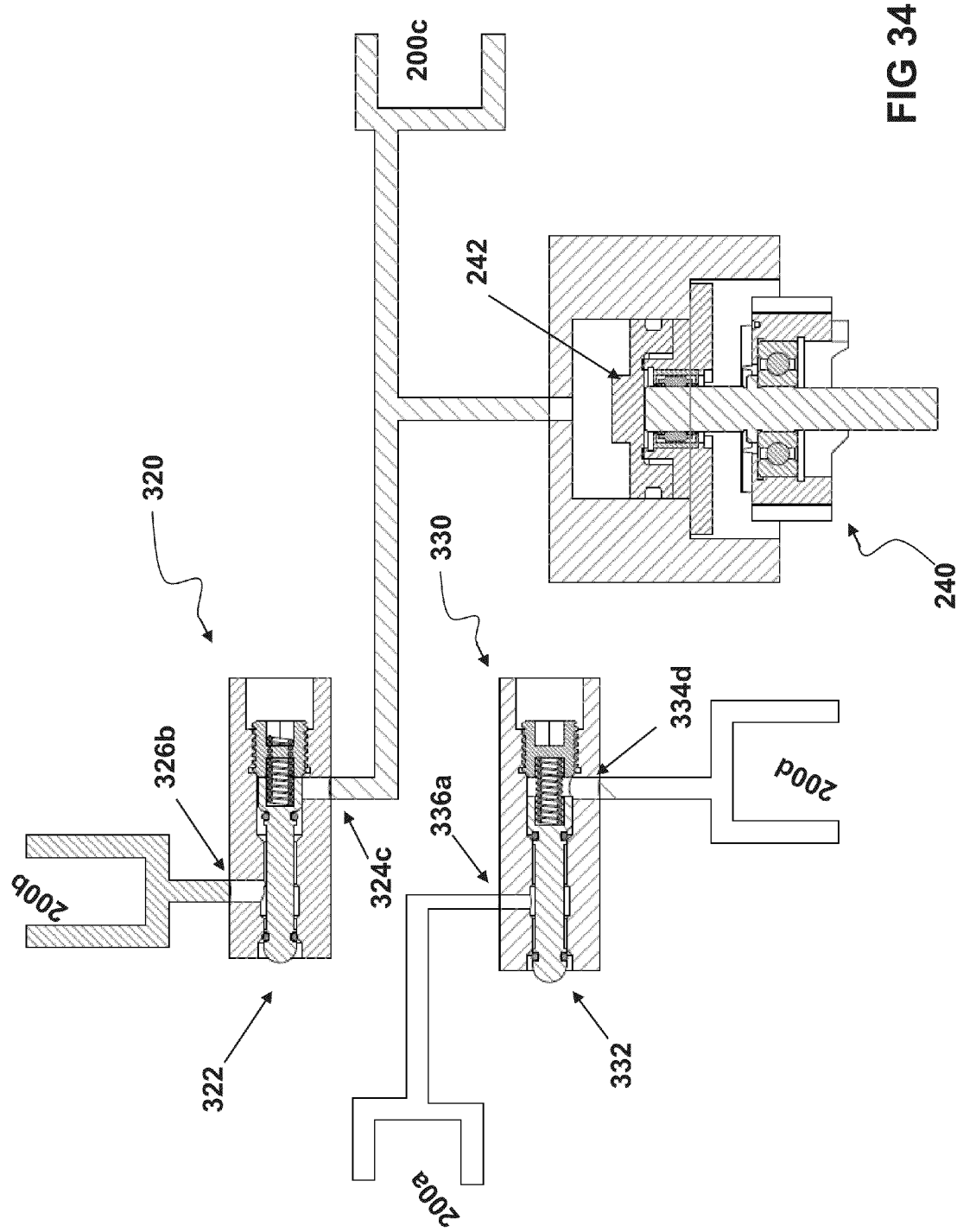
FIG. 34 is a schematic of the pneumatic logic control in the head attachment, showing the automatic retract pilot valve depressed.
Figure 35:
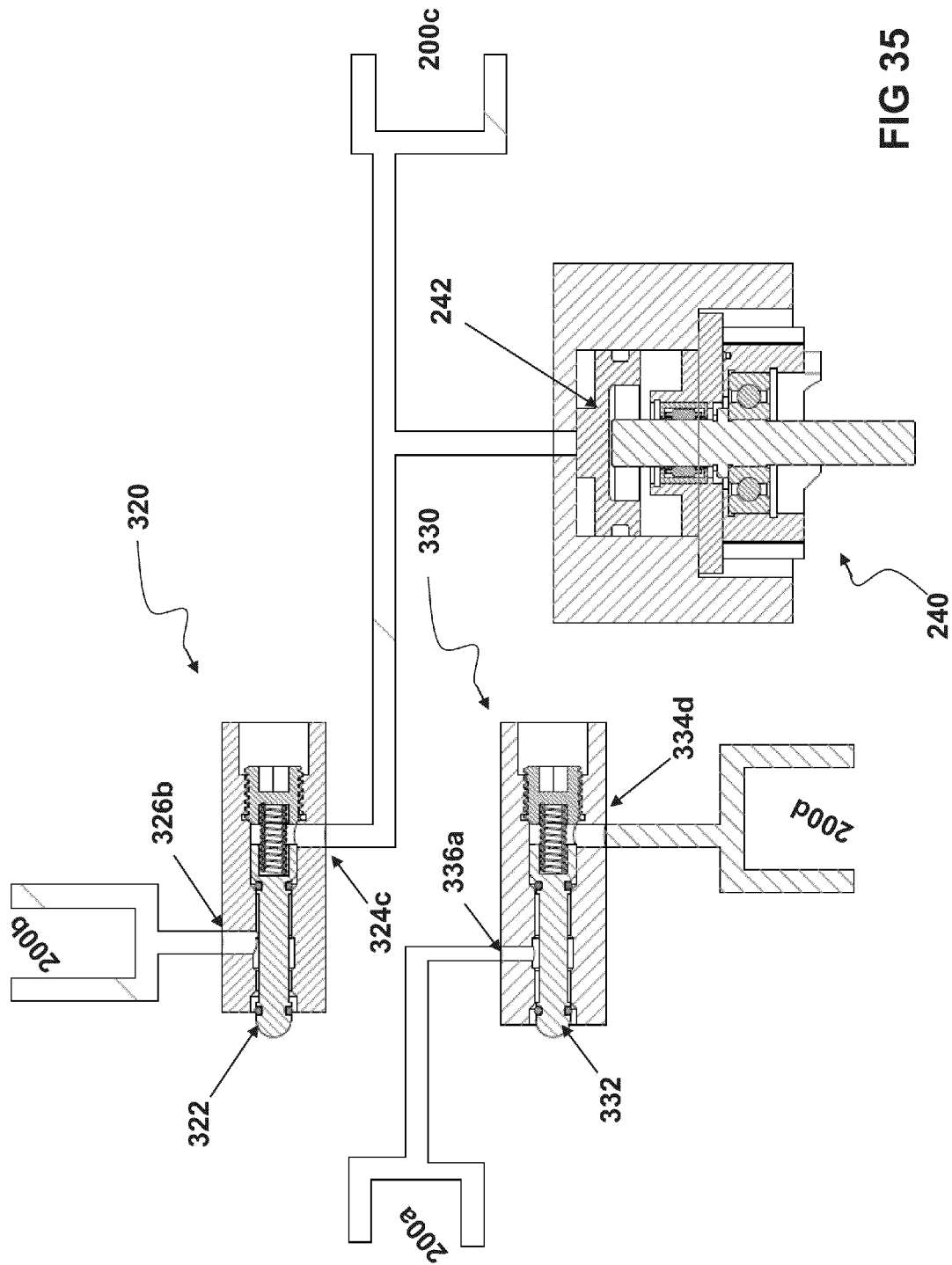
FIG. 35 is a schematic of the pneumatic logic control in the head attachment, showing the automatic retract pilot valve released.
Figure 36:
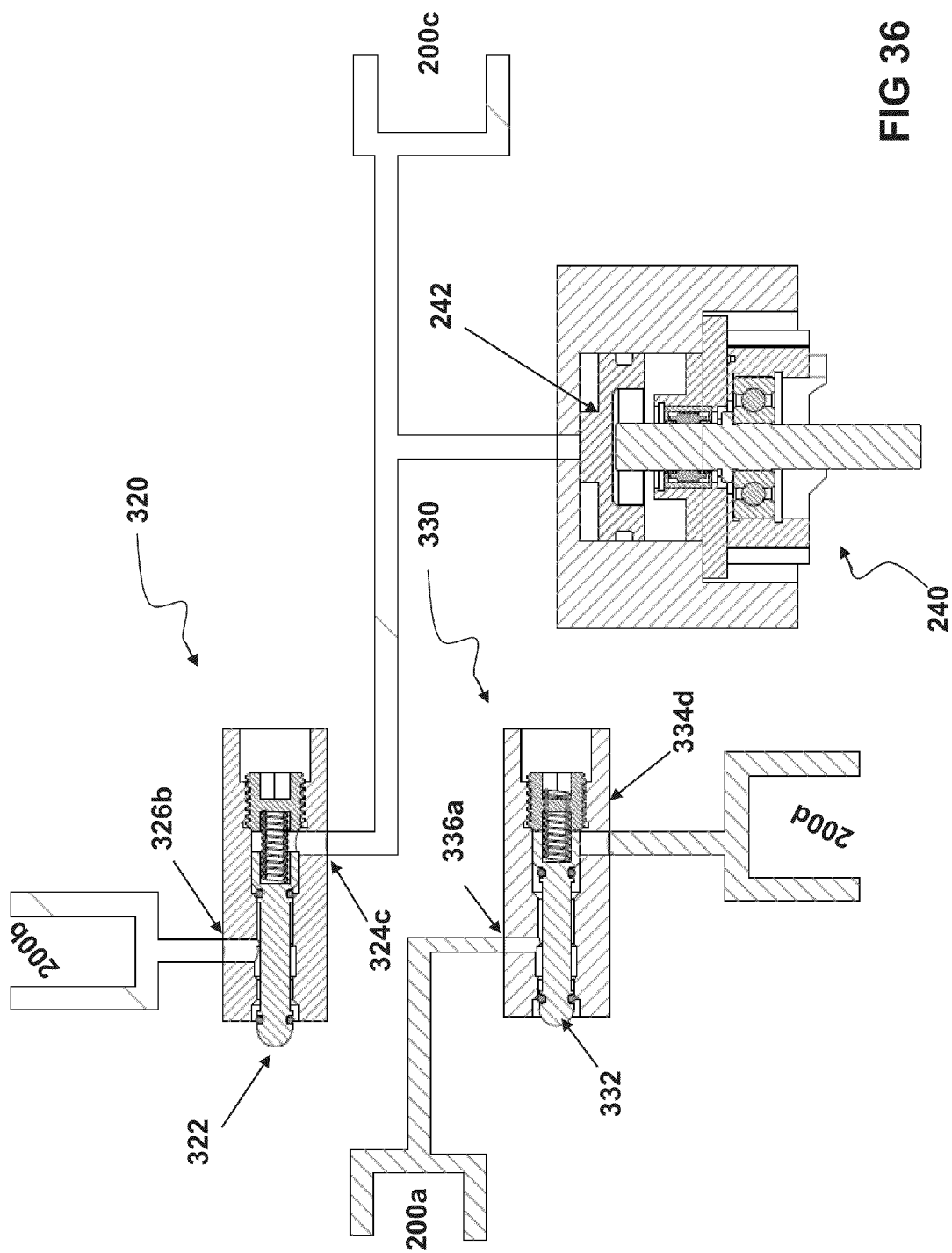
FIG. 36 is a schematic of the pneumatic logic control in the head attachment, showing the automatic stop pilot valve depressed.

Automatic retract pilot valve 320 (FIG. 32) is located in relation to drill spindle assembly 300, such that the head of stem 322 engages the first adjustable nut on cutter spindle 302. At the end of the feeding operation, movement of cutter spindle 302 causes first adjustable nut to depress stem 322 of automatic retract pilot valve 320. The compression of stem 322 as shown in FIG. 34 opens outlet port 326b of automatic retract pilot valve 320 that connects to port 100b on the face of the air motor housing assembly 100 (see FIG. 4) which leads to the port 170b of retract valve 170. As shown in FIG. 10(c), which shows the state of retract valve 170 when it receives a signal from port 170b, short valve spool 175 and long valve spool 174 are shifted to open port 170c to exhaust port 178a and pressurize port 170d. The pressurization of port 170d will pressurize port 200d, which will energize automatic stop pilot valve 330 in the head attachment as best shown in FIG. 35.

As port 170c of retract valve 170 connects to port 200c of transfer gear assembly 240 in head attachment 200, the exhaust of port 200c releases pressure behind air piston 242 (see FIG. 25) of transfer gear assembly 240. This causes the spring 276 to push up clutch feed gear 260 to disengage from transfer gear 270 and engage with clutch plate 250, which stops clutch feed gear 260 from rotation and consequently hold the feed gear 304 stationary, thereby resulting in retraction of cutter spindle 302.

To manually retract cutter spindle 302, retract pilot valve 150 is actuated by depressing retract pilot button 155 in FIG. 5. FIG. 16 shows retract pilot valve 150 in depressed mode. When retract pilot button 155 is depressed, outlet port 157q (see FIG. 7) is opened, thereby allowing pressure from line Z to pressurize line R that connects retract pilot valve 150 to retract valve 170. This causes air piston 177 in retract valve 170 to move forward as shown in FIGS. 10(d) and 16. When retract valve 170 is in this position, outlet port 170c of retract valve 170 will exhaust by opening to atmospheric pressure through port 178a and pressurize port 170d which will energize 200d as shown in FIG. 35.

FIG. 17 shows retract pilot valve 150 released after being depressed. As result of release, inlet port 146Z is closed, causing pressure in line R to exhaust through channels 145a in button 155 of retract pilot valve 150. In retract valve 170, pressure in line S keeps short valve spool 175 separated from long valve spool 174, consequently keeping port 170c open to exhaust port 178a and port 170d pressurized as best shown in FIG. 17. The pressurization of port 170d will pressurize port 200d, which will energize automatic stop pilot valve 330 in the head attachment as best shown in FIG. 35.

As described above, port 170c connects to transfer gear assembly 240 in head attachment 200. Accordingly, exhaust of port 170c in retract valve 170 will release the pressure behind air piston 242 in head attachment 200. When pressure behind air piston 242 is released by exhaust of port 170c-200c, spring 276 will push air piston 242 up, causing clutch feed gear 260 to disengage from transfer gear 270. As a result, clutch feed gear 260 is locked by clutch plate 250, stopping rotation of clutch feed gear 260. This causes cutter spindle 302 to retract.

Figure 33:
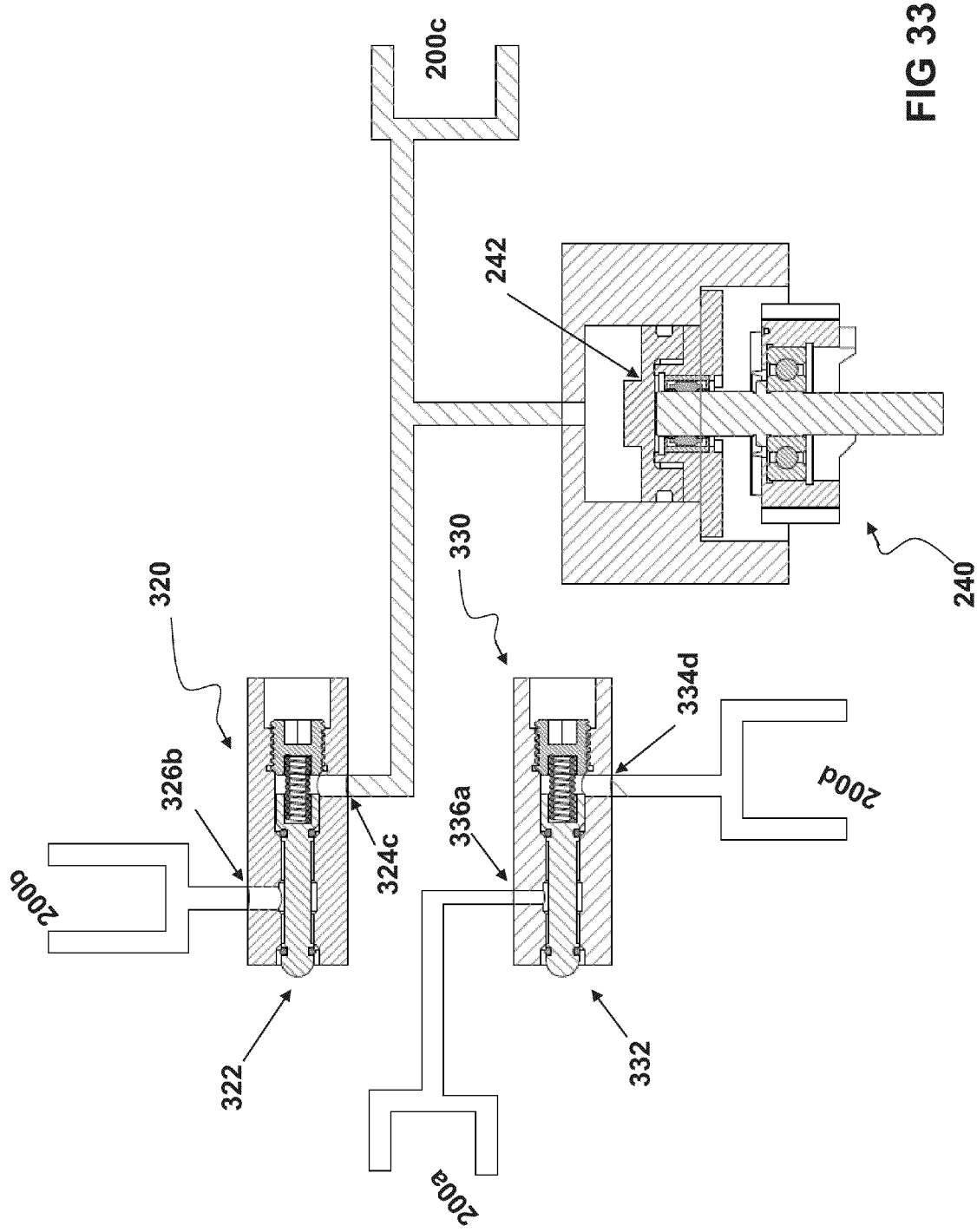
FIG. 33 is a schematic of the pneumatic logic control in the head attachment, showing the automatic retract pilot valve and the automatic stop pilot valve when the start pilot valve in the air motor housing assembly is depressed.

Automatic stop pilot valve 330 (FIG. 32) is located in relation to drill spindle assembly 300, such that the head of stem 332 engages the second adjustable nut on cutter spindle 302. At the end of the cycle, movement of cutter spindle 302 causes second adjustable nut to depress stem 332 of automatic stop pilot valve 330. The compression of stem 332 as shown in FIG. 33 opens port 336a of automatic stop pilot valve 330 that connects to shut off valve 160. This causes shut off valve 160 to open to exhaust, thus depressurizing line K. As a result, line S is also depressurized; consequently, air piston 112 in main air valve 110 rises, thereby closing port 110N in main air valve 110. This cuts off pressure to air motor 180 and results in its stoppage.

Figure 18:
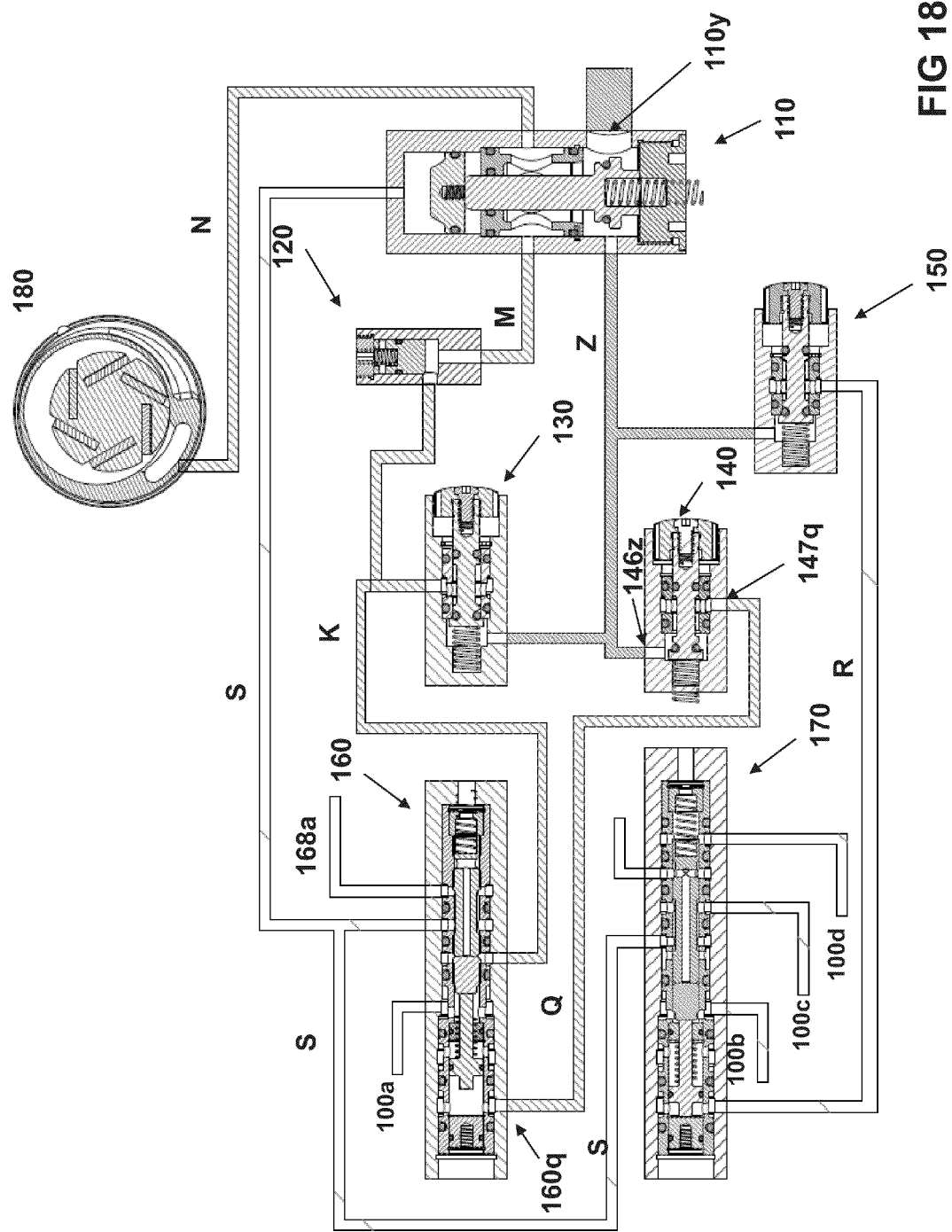
FIG. 18 is a schematic of the pneumatic logic control of the air motor housing assembly when the stop pilot valve is depressed.
Figure 19:
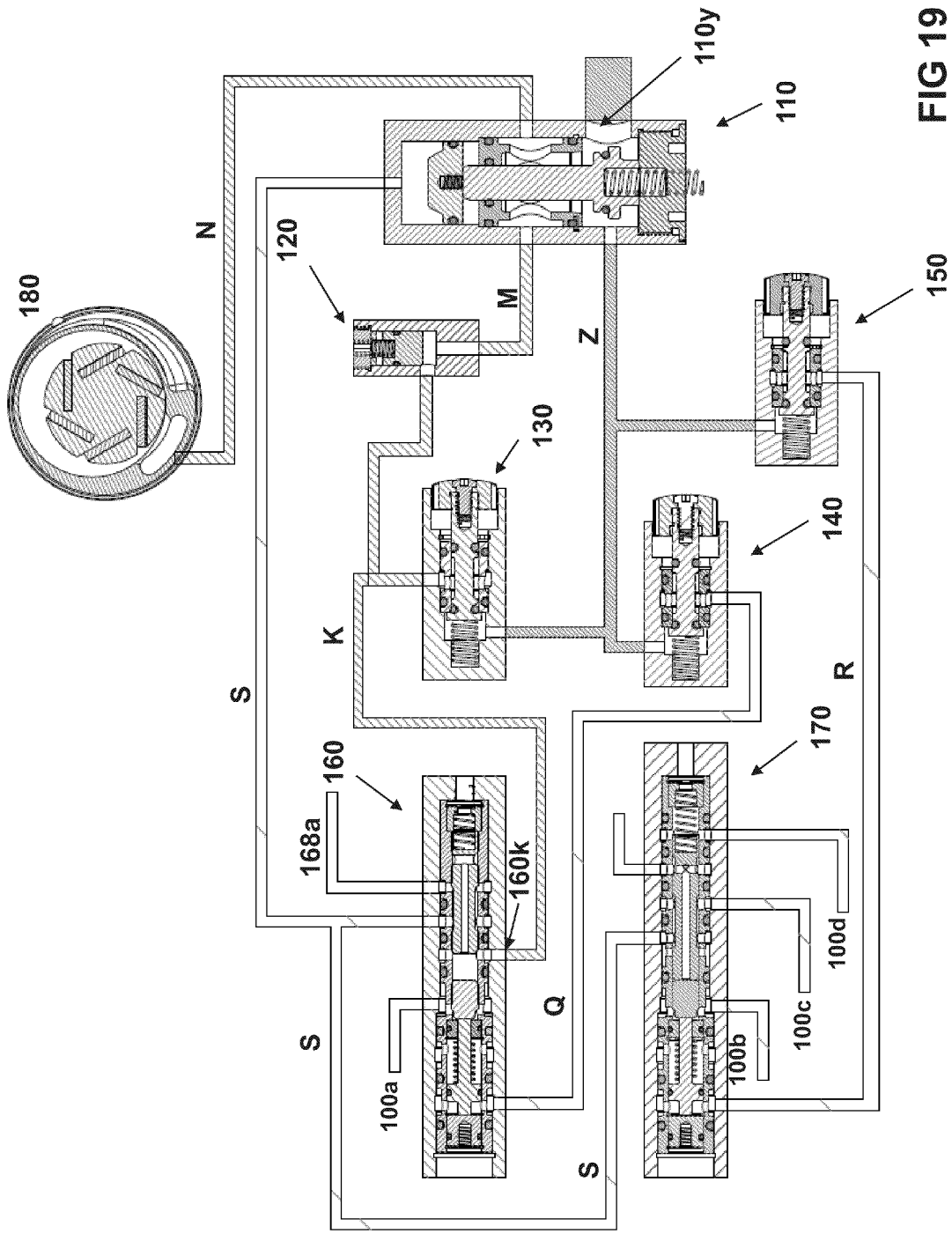
FIG. 19 is a schematic of the pneumatic logic control of the air motor housing assembly when the stop pilot valve is released.

To manually shut down operation of drill 1, stop button 145 of stop pilot valve 140 in air motor housing assembly 100 (FIG. 1) is depressed. FIG. 18 shows stop pilot valve 140 in depressed mode. Upon depression of stop button 145, line Q connecting stop pilot valve 140 to shut off valve 160 is pressurized, which causes air piston 167 (see FIG. 11) to push short spool 165 and long spool 164 forward, thereby opening exhaust ports 168a. In this position, outlet port 160S to line S will exhaust by opening to atmospheric pressure, which releases the air pressure behind air piston 112 in main air valve 110. As shown in FIG. 19, after stop pilot valve 140 is released, pressure in line Q is exhausted via channels 145a in stop pilot valve 140. Because line S is depressurized, air piston 112 in main air valve 110 will be pushed upward by spring 115 and inlet air pressure from port 110y, thereby closing port 110N of main air valve 110, thus shutting off air supply to air motor 180. Accordingly, air motor 180 shuts down and operation ceases.

FIG. 20 shows the pneumatic logic control system just after main air valve 110 shuts off air supply to air motor 180 and delay valve 120. At this moment, residual air pressure in line K keeps long spool 164 and short spool 165 in shut off valve 160 apart to ensure that the air pressure behind air piston 112 of main air valve 110 is completely exhausted through exhaust ports (not shown) in air motor 180. Consequently, main air valve 110 is completely shut off. The residual air pressure in line K will vent, via delay valve 120 and main air valve 110, through exhaust ports (not shown) in air motor 180. While delay valve 120 minimizes air leak through air motor 180 at the start of the feed cycle, it allows venting of line K through the exhaust port of air motor 180 at the end of the drilling cycle. The pneumatic system then returns to stand-by condition as shown in FIG. 12.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A drill comprising:
   an air motor assembly having an output spindle;
   a head attachment having a cutter spindle, the head attachment removably connected to the air motor assembly;
   wherein the head attachment further comprises:
   a drive assembly, the drive assembly driven by the air motor assembly;
   a transfer gear assembly engaged with the drive assembly, the transfer gear assembly driven by the drive assembly;
   a drill spindle assembly engaged with the transfer assembly, the drill spindle assembly driven by the transfer assembly; and
   a cutter spindle attached to the drill spindle assembly and capable of feeding and retracting;
   wherein the head attachment is capable of being configured in at least (i) a first mode in which the cutter spindle is parallel to the output spindle of the air motor assembly, and (ii) a second mode in which the cutter spindle is orthogonal to the output spindle of the air motor assembly.

2. The drill of claim 1, the drive assembly having a first receiving means for receiving the output spindle of the air motor assembly; wherein the cutter spindle is oriented in the first mode.

3. The drill of claim 2, the drive assembly further comprising a second receiving means for receiving an output spindle of the gear assembly; wherein the cutter spindle is oriented in the second mode.

4. The drill of claim 3, the air motor assembly further comprising:
   a main air valve pneumatically connected to an out source air supply;
   an air motor pneumatically connected to the main air valve;
   a delay valve pneumatically connected to the main air valve;
   a start pilot valve pneumatically connected to the main air valve;
   a stop pilot valve pneumatically connected to the main air valve;
   a retract pilot valve pneumatically connected to the main air valve;
   a shut-off valve, the shut-off valve pneumatically connected to the start pilot valve, the stop pilot valve, and the main air valve;
   a retract valve, the retract valve pneumatically connected to the shut-off valve, the retract pilot valve, and the main air valve.

5. The drill of claim 4, wherein the shut-off valve has a first port for communicating a pneumatic signal with the head attachment.

6. The drill of claim 4, wherein the retract valve comprises:
   a second port for communicating a pneumatic signal with the head attachment;
   a third port for communicating a pneumatic signal with the head attachment;
   a fourth port for communicating a pneumatic signal with the head attachment.

7. The drill of claim 4, wherein activation of the start pilot valve operates to pressurize a pneumatic line that activates the air motor.

8. The drill of claim 7, wherein activation of the start pilot valve pressurizes a pneumatic line connecting the start pilot valve to the shut-off valve, and the shut-off valve to the main air valve, and the main air valve to the air motor, thereby powering the air motor.

9. The drill of claim 8, wherein activation of the start pilot valve pressurizes a pneumatic line connected to the transfer gear assembly in the head attachment, such that a clutch feed gear engages the transfer gear, thereby causing the cutter spindle to feed.

10. The drill of claim 8, wherein the delay valve is connected between the start pilot valve and the main air valve, such that the delay valve operates to minimize air pressure leakage through the air motor when pilot start valve is activated.

11. The drill of claim 4, wherein the shut-off valve further comprises:
    a shut-off valve body housing a first spring, a long spool, a short spool, a balk head, a second spring and an air piston;
    the balk head separates the short spool and the long spool from the second spring and the air piston;
    the shut-off valve body housing having an inlet port that communicates with the air piston;
    wherein the air piston capable of moving the short spool and the long spool against the first spring upon receiving a pneumatic signal.

12. The drill of claim 4, wherein the retract valve further comprises:
    a retract valve body housing a first spring, a long spool, a short spool, a balk head, a second spring and an air piston;
    the balk head separates the short spool and the long spool from the second spring and the air piston;
    the retract valve body housing having an inlet port that communicates with the air piston; and
    wherein the air piston capable of moving the short spool and the long spool against the first spring upon receiving a pneumatic signal.

13. The drill of claim 4, wherein the retract pilot valve further comprises:
- a pilot body housing a spring, valve stem, a valve sleeve, and a pilot valve button;
- the valve sleeve held between an internal shoulder of the pilot body and a retaining ring;
- the spring urging the valve stem against the valve sleeve to seal an inlet port from an outlet port;
- a button mounted to a head of the valve stem, the button having channels to allow air in the start pilot valve to exhaust to atmosphere; and
- an o-ring on the valve stem that seals the outlet port when the button is depressed and unseal to release pressure when the button is released.

14. The drill of claim 1, the transfer gear assembly further comprising:
- a piston, the piston operated by pneumatic signal from the air motor assembly;
- a clutch feed gear, the clutch feed gear capable of movement in response to operation of the piston;
- a transfer gear, the transfer gear being capable of engaging the clutch feed gear;
- wherein the transfer assembly operates to feed the cutter spindle when the clutch feed gear and the transfer gear are engaged; and
- wherein the cutter spindle retracts when the clutch feed gear and the transfer gear are disengaged.

15. The drill of claim 1, wherein the drive assembly further comprises:
- a drive shaft having a first end and a second end, the first end having internal splines for receiving an output spindle of an air motor for operation in the first mode, and the second end having external splines for engaging a bevel-spur gear assembly;
- wherein the bevel-spur gear assembly coaxially mounted to the drive shaft, the bevel-spur gear assembly including a bevel gear and a spur gear that are keyed together to rotate together as one unit;
- wherein the bevel gear has internal splines for engaging the external splines of the drive shaft;
- wherein the spur gear has a tail for mounting the bevel-spur gear assembly in a ball bearing;
- a drive bevel gear having internal splines for engaging the output spindle of the air motor for operation in a second mode, the drive bevel gear mounted with its centerline axis perpendicular to the drive shaft;
- wherein in the first mode a cutter spindle is oriented parallel to the output spindle of the air motor, and wherein in the second mode the cutter spindle is oriented orthogonal to the output spindle of the air motor.

* * * * *